US010949894B1

(12) United States Patent
Bansal et al.

(10) Patent No.: US 10,949,894 B1
(45) Date of Patent: Mar. 16, 2021

(54) METHOD, APPARATUS, AND COMPUTER PROGRAM PRODUCT FOR FACILITATING DYNAMIC PRICING

(71) Applicant: Groupon, Inc., Chicago, IL (US)

(72) Inventors: Bhupesh Bansal, Sunnyvale, CA (US); Rahim Daya, Chicago, IL (US); Vyomkesh Tripathi, Chicago, IL (US); Francisco Larrain, Palo Alto, CA (US); Kamson Lai, Chicago, IL (US); Hernan Arroyo, Chicago, IL (US); Gaston L'Huillier, Cambridge, MA (US); Ricardo Zilleruelo, Chicago, IL (US); Latife Genc-Kaya, Santa Clara, CA (US); Shi Zhao, Fremont, CA (US)

(73) Assignee: Groupon, Inc., Chicago, IL (US)

( * ) Notice: Subject to any disclaimer, the term of this patent is extended or adjusted under 35 U.S.C. 154(b) by 595 days.

(21) Appl. No.: 14/298,291

(22) Filed: Jun. 6, 2014

Related U.S. Application Data

(60) Provisional application No. 61/832,467, filed on Jun. 7, 2013.

(51) Int. Cl.
  *G06Q 30/02* (2012.01)
(52) U.S. Cl.
  CPC ..... *G06Q 30/0276* (2013.01); *G06Q 30/0206* (2013.01); *G06Q 30/0207* (2013.01); *G06Q 30/0211* (2013.01)
(58) Field of Classification Search
  CPC .................................................. G06Q 30/02
  See application file for complete search history.

(56) References Cited

U.S. PATENT DOCUMENTS

| | | | |
|---|---|---|---|
| 5,960,407 A | 9/1999 | Vivona | |
| 6,401,075 B1 | 6/2002 | Mason et al. | |
| 7,076,695 B2 | 7/2006 | McGee et al. | |
| 7,580,878 B1 * | 8/2009 | Nieto | G06Q 30/02 705/36 R |
| 7,882,046 B1 | 2/2011 | Kizhakkekalathil et al. | |
| 7,912,748 B1 | 3/2011 | Rosenberg et al. | |
| 8,050,976 B2 | 11/2011 | Staib et al. | |

(Continued)

FOREIGN PATENT DOCUMENTS

JP        2005-023648 A        1/2005

OTHER PUBLICATIONS

Office Action from U.S. Appl. No. 13/930,519, dated Apr. 1, 2016.
(Continued)

*Primary Examiner* — Vincent M Cao
(74) *Attorney, Agent, or Firm* — Alston & Bird LLP

(57) ABSTRACT

Provided herein are systems, methods and computer readable media for facilitating pricing. An example method may include determining a price adjustable promotion from a plurality of promotions, the price adjustable promotion having a first promotional price, a forecasted demand that provides an indication of a promotion inventory exhaustion period and a plurality of redemption parameters that comprise at least a promotional period, a promotional value and a redemption expiration and causing the price adjustable promotion to be offered at the second promotional price while at least one of the plurality of redemption parameters for the price adjustable promotion remain constant.

33 Claims, 13 Drawing Sheets

(56) References Cited

U.S. PATENT DOCUMENTS

| | | | |
|---|---|---|---|
| 8,354,926 | B2 | 1/2013 | Donovan et al. |
| 8,645,190 | B1 | 2/2014 | Juda et al. |
| 9,105,046 | B1 | 8/2015 | Dias et al. |
| 9,305,310 | B2 | 4/2016 | Radhakrishnan et al. |
| 9,665,556 | B1 | 5/2017 | Sutariya et al. |
| 2003/0079160 | A1 | 4/2003 | McGee et al. |
| 2003/0135460 | A1 | 7/2003 | Talegon |
| 2003/0177112 | A1 | 9/2003 | Gardner |
| 2004/0068455 | A1* | 4/2004 | Jacobus .................. G06Q 40/06 705/36 R |
| 2004/0068459 | A1* | 4/2004 | Goulet .................... G06Q 30/02 705/37 |
| 2004/0168123 | A1 | 8/2004 | Lomelin-Stoupignan et al. |
| 2005/0189414 | A1* | 9/2005 | Fano ........................ G06Q 30/02 235/383 |
| 2006/0095281 | A1 | 5/2006 | Chickering et al. |
| 2006/0161504 | A1* | 7/2006 | Walser .................... G06Q 10/06 705/400 |
| 2006/0287916 | A1 | 12/2006 | Starr et al. |
| 2007/0055554 | A1* | 3/2007 | Sussman ................ G06Q 10/02 705/5 |
| 2007/0244977 | A1 | 10/2007 | Atkins |
| 2008/0004962 | A1 | 1/2008 | Muthukrishnan et al. |
| 2008/0059384 | A1 | 3/2008 | Eglen et al. |
| 2008/0091524 | A1 | 4/2008 | Yan et al. |
| 2008/0140508 | A1 | 6/2008 | Anand et al. |
| 2009/0055405 | A1 | 2/2009 | Brier et al. |
| 2009/0089173 | A1* | 4/2009 | Miyake .................. G06Q 30/02 705/20 |
| 2009/0210286 | A1 | 8/2009 | Bisdikian |
| 2009/0249321 | A1 | 10/2009 | Mandyam et al. |
| 2009/0265243 | A1 | 10/2009 | Karassner et al. |
| 2009/0327037 | A1 | 12/2009 | Ng et al. |
| 2010/0016080 | A1 | 1/2010 | Garden et al. |
| 2010/0037157 | A1 | 2/2010 | Chang et al. |
| 2010/0042490 | A1 | 2/2010 | Boal |
| 2010/0063877 | A1 | 3/2010 | Soroca et al. |
| 2010/0198694 | A1 | 8/2010 | Muthukrishnan |
| 2010/0287103 | A1 | 11/2010 | Mason |
| 2010/0313139 | A1 | 12/2010 | Watfa |
| 2010/0318407 | A1 | 12/2010 | Leff et al. |
| 2011/0035276 | A1 | 2/2011 | Ghosh et al. |
| 2011/0035744 | A1 | 2/2011 | Bhatia |
| 2011/0099077 | A1 | 4/2011 | Darin et al. |
| 2011/0131099 | A1 | 6/2011 | Shields et al. |
| 2011/0153412 | A1 | 6/2011 | Novikov et al. |
| 2011/0196731 | A1 | 8/2011 | Christie et al. |
| 2011/0313840 | A1 | 12/2011 | Mason et al. |
| 2012/0066055 | A1 | 3/2012 | Nomula |
| 2012/0089461 | A1 | 4/2012 | Greenspan |
| 2012/0096429 | A1 | 4/2012 | Desai et al. |
| 2012/0226526 | A1 | 9/2012 | Donovan et al. |
| 2012/0226543 | A1* | 9/2012 | Dayala .................... G06Q 30/02 705/14.26 |
| 2012/0259866 | A1 | 10/2012 | Austin et al. |
| 2013/0166360 | A1* | 6/2013 | Kshetramade ......... G06Q 30/02 705/14.1 |
| 2013/0211961 | A1* | 8/2013 | Walker .................... G06Q 30/02 705/26.41 |
| 2013/0238424 | A1 | 9/2013 | Ramer et al. |
| 2013/0246207 | A1 | 9/2013 | Novak et al. |
| 2013/0325585 | A1 | 12/2013 | Amit et al. |
| 2013/0326354 | A1 | 12/2013 | Anderson |
| 2013/0339137 | A1 | 12/2013 | Lempel et al. |
| 2014/0006139 | A1 | 1/2014 | Aggarwal et al. |
| 2014/0074595 | A1 | 3/2014 | Chomsky et al. |
| 2014/0351268 | A1 | 11/2014 | Weskamp et al. |

OTHER PUBLICATIONS

Office Action from U.S. Appl. No. 13/930,527, dated Feb. 23, 2016.
Office Action from U.S. Appl. No. 13/930,532, dated Mar. 4, 2016.
U.S. Application filed Mar. 15, 2013, U.S. Appl. No. 13/839,958.
U.S. Application filed Mar. 15, 2013, U.S. Appl. No. 13/838,711.
U.S. Application filed Mar. 15, 2013, U.S. Appl. No. 13/838,415.
U.S. Application filed Jun. 28, 2013, U.S. Appl. No. 13/930,519.
How to Write Advertisements that Sell, author unknown, from System, the magazine of Business, dated 1912, downloaded from http://library.duke.edu/digitalcollections/eaa_Q0050/ on Feb. 21, 2015.
U.S. Application from U.S. Appl. No. 13/219,344, filed Aug. 26, 2011.
U.S. Application from U.S. Appl. No. 13/826,866, filed Mar. 14, 2013.
U.S. Application from U.S. Appl. No. 13/826,333, filed Mar. 14, 2013.
U.S. Application from U.S. Appl. No. 13/411,502, filed Mar. 2, 2012.
U.S. Application from U.S. Appl. No. 13/839,360, filed Mar. 15, 2013.
U.S. Application from U.S. Appl. No. 13/460,745, filed Apr. 30, 2012.
Office Action from U.S. Appl. No. 14/453,179, dated Sep. 25, 2014.
Notice of Allowance from U.S. Appl. No. 14/453,179 dated Jul. 28, 2016.
Office Action from U.S. Appl. No. 13/930,519, dated Jun. 4, 2015.
Office Action from U.S. Appl. No. 13/930,532, dated Jun. 18, 2015.
Office Action from U.S. Appl. No. 13/930,527, dated Jun. 24, 2015.
Office Action for U.S. Appl. No. 14/453,179, dated Feb. 13, 2015.
Brooks, Charlie, The Banner Ad Masks the HTML Code, from Demand Media, downloaded Mar. 31, 2020 from https://web.archive.org/web/20121017090251/https://smallbusiness.chron.com/banner-ad-masks-html-code-37474.html (Year: 2012).
Burns, Joe, Basic HTML: Adding Images, downloaded Mar. 31, 2020 from https://web.archive.org/web/20121107115452/https://www.htmlgoodies.com/primers/html/article.php/3478181/Basic-HTML-Images.htm—with Archive.org header (Year: 2012).
Flaherty, Rob, Responsive Ads in the Real World: Ad Server Implementation, downloaded Mar. 31, 2020 from http://www.ravelrumba.com/blog/responsive-ads-real-world-ad-server-implementation/, dated Feb. 19, 2012 (Year: 2012).
Quora, Is there a way to develop a website without HTML/CSS?, downloaded from https://www.quora.com/Is-there-a-way-to-develop-a-website-without-HTML-CSS on Mar. 31, 2020 (Year: 2019).
*University of Florida Research Foundation, Inc. v. General Electric Co.* (Fed. Cir. 2019), case No. 2018-1284, available: at http://www.cafc.uscourts.gov/sites/default/files/opinions-orders/18-1284.Opinion.2-26-2019.pdf (Year: 2019).

* cited by examiner

METHOD, APPARATUS, AND COMPUTER PROGRAM PRODUCT FOR FACILITATING DYNAMIC PRICING

CROSS REFERENCES TO RELATED APPLICATIONS

This application claims priority to U.S. Provisional Patent Application No. 61/832,467, titled "METHOD, APPARATUS, AND COMPUTER PROGRAM PRODUCT FOR FACILITATING DYNAMIC PRICING" filed on Jun. 7, 2013, which is hereby incorporated by reference.

FIELD

Embodiments of the invention relate, generally, to facilitating dynamic pricing of one or more eligible promotions.

BACKGROUND

Applicant has discovered problems with current methods of pricing promotions. In some examples, the determination of eligibility of price adjustable promotions and the dynamic adjustment of the promotion prices may be improved. Through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods and computer readable media for the facilitation of dynamic pricing.

In one embodiment, a method is provided, the method comprising determining a price adjustable promotion from a plurality of promotions, the price adjustable promotion having a first promotional price, a forecasted demand that provides an indication of a promotion inventory exhaustion period and a plurality of redemption parameters that comprise at least a promotional period, a promotional value and a redemption expiration, determining that the promotion inventory exhaustion period overlaps a next price change time demonstrating that the first promotional price is adjustable prior to an expiration of the promotion inventory exhaustion period, wherein the next price change time defines a next time that the first promotional price can be adjusted, generating, using a processor, a second promotional price for the price adjustable promotion by adjusting the first promotional price based on the forecasted demand, a remaining inventory of the promotion and an estimated revenue, and causing the price adjustable promotion to be offered at the second promotional price while at least one of the plurality of redemption parameters for the price adjustable promotion remain constant.

In one embodiment, the method may further comprise accessing promotion data for the price adjustable promotion, wherein the promotion data includes a quantity of units that make up the price adjustable promotion inventory and at least one of a category of the price adjustable promotion, a category of a merchant offering the price adjustable promotion, or a merchant quality score of the merchant offering the price adjustable promotion.

In one embodiment, determining a price adjustable promotion from a plurality of promotions further comprises determining that the price adjustable promotion is eligible for a price adjustment based on the forecasted demand and promotion data for the promotion being received within a predefined time window. In one embodiment, the method may further comprise determining a probability that the price adjustable promotion will sell out using a model trained to classify the anticipated demand of the promotion, comparing a confidence value indicative of the strength of the determined probability that the price adjustable promotion will sell out to a predetermined revenue threshold, and outputting a forecasted demand for the price adjustable promotion in an instance in which the confidence value satisfies the predetermined revenue threshold.

In one embodiment, the probability that the price adjustable promotion will sell out is based on a pre-feature of the promotion and a calculated intensity of the demand for the promotion during the pre-feature. In one embodiment, the probability that the price adjustable promotion will sell out is based on historical data.

In one embodiment, the next pricing change time is a function of a next communication to one or more consumers that indicates a promotional price for the price adjustable promotion. In one embodiment, the next pricing change time is a function of a market reaction data, collected periodically. In one embodiment, the next pricing change time is a time at which the price adjustable promotion is first offered via the promotion service. In one embodiment, the next pricing change time is generated by estimating a velocity of sales of the price adjustable promotion based on at least one of the forecasted demand, historical sales data or current sales data for the price adjustable promotion, and determining the next pricing change time as a function of a remaining quantity of units that make up the price adjustable promotion inventory and a revenue value.

In one embodiment, generating the second promotional price for the price adjustable promotion further comprises comparing a promotion quantity factor to a first pricing threshold value, wherein in an instance in which the promotion quantity factor satisfies the first pricing threshold value generating a second promotion price for the promotion as a function of a first pricing factor and a margin value generated by the first promotion price, and comparing the promotion quantity factor to a second pricing threshold value in an instance in which the promotion quantity factor does not satisfy the first dynamic pricing threshold value, wherein in an instance in which the promotion quantity factor satisfies the second pricing threshold value, generating a second promotion price as a function of a second pricing factor and a margin value generated by the first promotion price.

In another embodiment, a method may be provided for dynamic price adjustment of one or more promotions offered by a promotion service, at least one of the promotions being designed in part by a merchant via an interface, the method may comprise receiving promotion data for a promotion from a merchant, wherein the promotion data includes a quantity of units to be offered and a first promotion price, accessing one or more price change times for the promotion based on a promotion sales cycle, forecasting demand data for the promotion, wherein the demand data is indicative of a probability and a rate that the promotion will sell out, determining, using a processor, a price change time for the promotion, the price change time indicative of the time that a first promotion price is to be adjusted to a second promotion price so as to enable the adjustment of the price prior to promotion sell out in an instance in which the second promotion price satisfies a predetermined revenue threshold, and causing the merchant to be notified that the promotion is to be offered at the second promotion price.

In one embodiment, the method may further comprise accessing promotion data for the promotion, wherein the promotion data further includes at least one of a category of the promotion, a category of a merchant offering the promotion, or a merchant quality score of the merchant offering the promotion. In one embodiment, the method may further comprise determining a probability that the promotion will sell out using a model trained to classify the anticipated demand of the promotion, comparing a confidence value indicative of the strength of the determined probability that the promotion will sell out to a predetermined revenue threshold, and outputting a forecasted demand for the promotion in an instance in which the confidence value satisfies the predetermined revenue threshold.

In one embodiment, the probability that the promotion will sell out is based on a pre-feature of the promotion and a calculated intensity of the demand for the promotion during the pre-feature. In one embodiment, the probability that the promotion will sell out is based on historical data. In one embodiment, the price change time is a function of a next communication to one or more consumers that indicates a promotional price for the price adjustable promotion. In one embodiment, the price change time is a function of a market reaction data, collected periodically. In one embodiment, the price change time is a time at which the promotion is first offered via the promotion service. In one embodiment, the next pricing change time is generated by estimating a velocity of sales of the price adjustable promotion based on at least one of the forecasted demand, historical sales data or current sales data for the price adjustable promotion, and determining the next pricing change time as a function of a remaining quantity of units that make up the price adjustable promotion inventory and a revenue value.

In one embodiment, generating the second promotional price for the promotion further by comparing a promotion quantity factor to a first pricing threshold value, wherein in an instance in which the promotion quantity factor satisfies the first pricing threshold value generating a second promotion price for the promotion as a function of a first pricing factor and a margin value generated by the first promotion price, and comparing the promotion quantity factor to a second pricing threshold value in an instance in which the promotion quantity factor does not satisfy the first dynamic pricing threshold value, wherein in an instance in which the promotion quantity factor satisfies the second pricing threshold value, generating a second promotion price as a function of a second pricing factor and a margin value generated by the first promotion price.

In one embodiment, a method is provided for dynamically adjusting a price for a promotion of a plurality of promotions offered via a promotion service, the promotion service defining a promotion offering cycle using a plurality of pricing periods, the method comprising accessing promotion data for the promotion, wherein the promotion data includes a quantity of units offered via the promotion and a first promotion price, forecasting demand data for the promotion, wherein the demand data is indicative of the probability that the promotion will sell out in one or more future pricing periods of the plurality of pricing periods, determining that the promotion is eligible for a price adjustment based on demand data and promotion data being received within a predefined time window and a forecasted availability of the promotion in the one or more future pricing periods, generating, using a processor, a second promotion price for the promotion in the one or more future pricing periods in an instance in which the promotion is eligible for price adjustment by comparing a promotion quantity factor to a first pricing threshold value, wherein in an instance in which the promotion quantity factor satisfies the first pricing threshold value generating a second promotion price for the promotion as a function of a first pricing factor and a margin value generated by the first promotion price, and comparing the promotion quantity factor to a second pricing threshold value in an instance in which the promotion quantity factor does not satisfy the first dynamic pricing threshold value, wherein in an instance in which the promotion quantity factor satisfies the second pricing threshold value, generating a second promotion price as a function of a second pricing factor and a margin value generated by the first promotion price, and causing the promotion to be offered at the second promotion price.

In one embodiment, the method may further comprise accessing promotion data for the promotion, wherein the promotion data further includes at least one of a category of the price adjustable promotion, a category of a merchant offering the price adjustable promotion, or a merchant quality score of the merchant offering the price adjustable promotion. In one embodiment, the method may further comprise determining a probability that the promotion will sell out using a model trained to classify the anticipated demand of the promotion, comparing a confidence value indicative of the strength of the determined probability that the promotion will sell out to a predetermined revenue threshold, and outputting a forecasted demand for the promotion in an instance in which the confidence value satisfies the predetermined revenue threshold.

In one embodiment, the probability that the promotion will sell out is based on a pre-feature of the promotion and a calculated intensity of the demand for the promotion during the pre-feature. In one embodiment, the probability that the price adjustable promotion will sell out is based on historical data. In one embodiment, the method may further comprise calculating a pricing change time as a function of a next communication to one or more consumers that indicates a promotional price for the price adjustable promotion.

In one embodiment, the method may further comprise calculating a pricing change time as a function of a market reaction data, collected periodically. In one embodiment, the method may further comprise calculating a pricing change time as a time at which the price adjustable promotion is first offered via the promotion service. In one embodiment, the method may further comprise calculating a pricing change time, wherein next pricing change time is generated by estimating a velocity of sales of the promotion based on at least one of the forecasted demand, historical sales data or current sales data for the promotion, and determining the pricing change time as a function of a remaining quantity of units that make up the price adjustable promotion inventory and a revenue value.

In one embodiment, a computing system may be provided, the computing system may be configured to dynamically adjusting a price for a promotion offered via a promotion service, the promotion service defining a promotion offering cycle using a plurality of pricing periods, the computing system comprising a memory, a promotion data collection system, stored in the memory and configured when executed on a computer processor to access promotion data for the promotion, wherein the promotion data includes a quantity of units offered via the promotion and a first promotion price, a demand forecast system, stored in the memory and configured when executed on the computer processor to cause the processor to request data related to the promotion from the promotion data collection system and to generate demand data that is indicative of the probability that the promotion will sell out, a dynamic pricing system, stored in the memory and configured when executed on the computer processor to cause the processor to determine that the promotion is eligible for a price adjustment based on demand data being generated by the demand forecast system within a predefined time window and promotion data being generated by the promotion data collection system within the predefined time window and a forecasted availability of the promotion in one or more future pricing periods of the plurality of pricing periods and to cause the generation of a second promotion price for the promotion in the one or more future pricing periods in an instance in which the promotion is eligible for price adjustment, and a dynamic price calculator system stored in the memory and configured when executed on the computer processor to generate the second promotion price based on an indication provided by the dynamic pricing system, the dynamic price calculator system further configured when executed on the computer processor to compare a promotion quantity factor to a first pricing threshold value, wherein in an instance in which the promotion quantity factor satisfies the first pricing threshold value generating a second promotion price for the promotion as a function of a first pricing factor and a margin value generated by the first promotion price, and compare a promotion quantity factor to a second pricing threshold value in an instance in which the promotion quantity factor does not satisfy the first dynamic pricing threshold value, wherein in an instance in which the promotion quantity factor satisfies the second pricing threshold value, generating a second promotion price as a function of a second pricing factor and a margin value generated by the first promotion price.

In another embodiment a method is provided for causing a price adjustable promotion to be displayed via one or more interfaces to one or more users with a first promotional price and a plurality of redemption parameters, measuring, using a processor, a demand for the price adjustable promotion by calculating an intensity of demand based on a calculation of sales of the price adjustable promotion in an instance in which the price adjustable promotion is displayed for a predetermined amount of time, and calculating an intensity of demand based on a calculation of historical performance in an instance in which the price adjustable promotion is not displayed for a predetermined amount of time, and causing the price adjustable promotion to be offered at a second promotional price while at least one of the plurality of redemption parameters for the price adjustable promotion remain constant.

In one embodiment, the method may further comprise causing the price adjustable promotion to be offered at the second promotional price based on a myopic pricing policy. In one embodiment, the method may further comprise causing the price adjustable promotion to be offered at the second promotional price based on a semi-myopic pricing policy. In one embodiment, the method may further comprise causing the price adjustable promotion to be offered at the second promotional price based on a non-myopic pricing policy.

In one embodiment, the non-myopic pricing policy further comprises defining one or more time windows in which the price adjustable promotion is to be displayed, generating a third adjustable promotional price for a first time window of the one or more time windows, generating a fourth adjustable promotional price for a second time window of the one or more time windows, determining that the fourth adjustable promotional price does not satisfy a revenue threshold, and re-generating the third adjustable promotional price until the third adjustable promotional price and the fourth adjustable promotional price both satisfy the revenue threshold.

In one embodiment a method is provided for causing a connection with a promotional marketplace, wherein the promotional marketplace offers one or more price adjustable promotion that have a plurality of redemption parameters, monitoring data received through the connection to the promotional marketplace, detecting an indication of a revenue value for a sale of a price adjustable promotion of the one or more price adjustable promotions that was offered at a second promotional price, wherein the price adjustable promotion was initially offered at a first promotional price, determining, using a processor, a third promotional price based on the indication of the revenue value, and causing the promotion service to offer the price adjustable promotion at the third promotional price while at least one of the plurality of redemption parameters for the price adjustable promotion remain constant.

In one embodiment, the monitoring data received through the connection to the promotional marketplace is usable to determine an updated price, a price change time, a demand function and a demand function change time.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
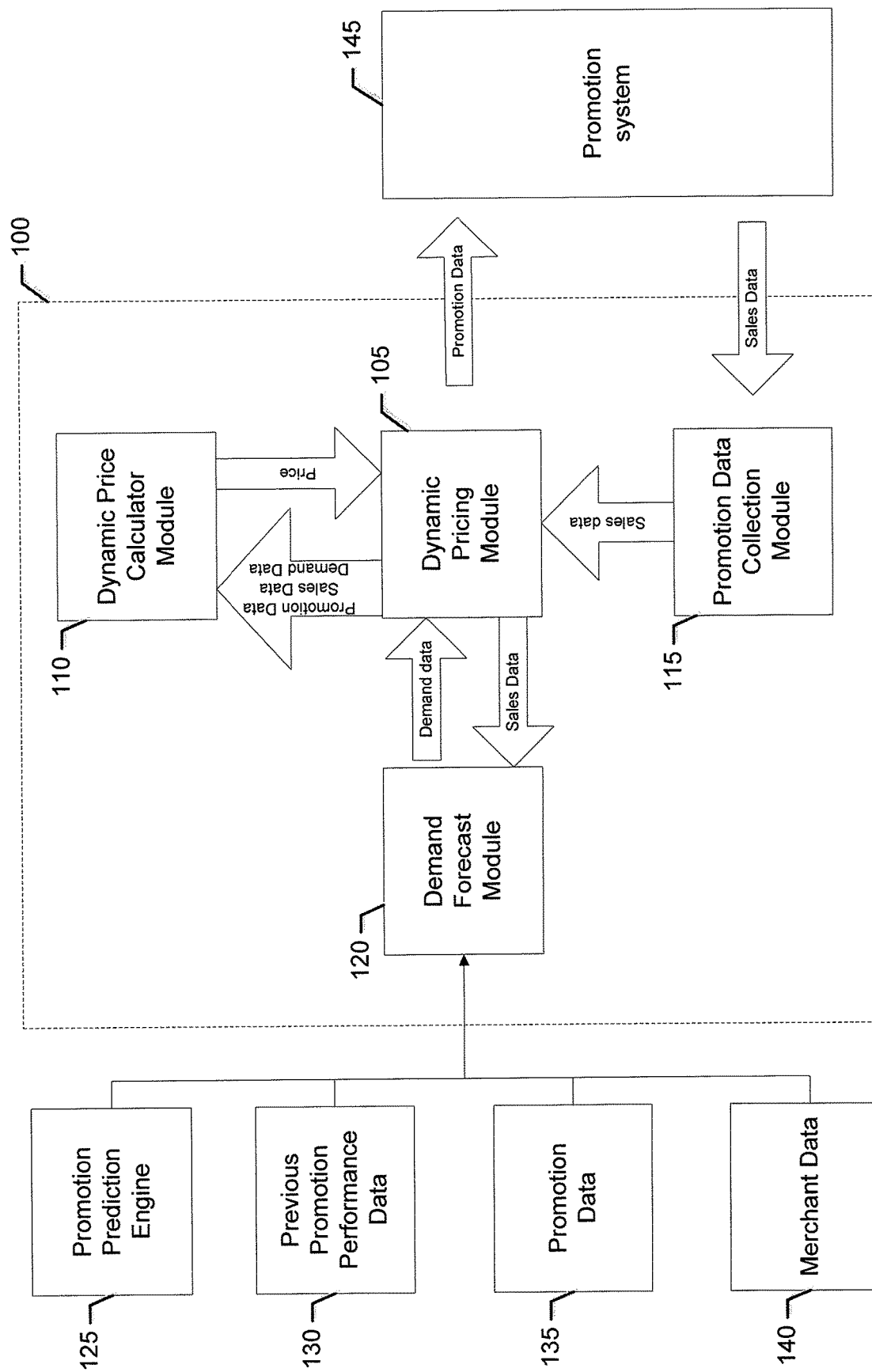
FIG. 1 is block diagram of a pricing system that is configured to facilitate dynamic pricing, in accordance with an example embodiment.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

BRIEF OVERVIEW

Methods, apparatus and computer program products described herein are operable for facilitating dynamic pricing of one or more promotions offered by a promotion and marketing system. In one example, a first price at which a promotion is offered may be changed to a second price based on one or more factors, such as available remaining inventory, forecasted demand, sales velocity, revenue maximization or the like.

In a further example, the method, apparatus and computer program product may be configured to, for a given promotion, determine when the promotion offering price should be updated and further determining a value (e.g., in terms of revenue, in terms of sales velocity and/or the like) of the new price. Further, the reaction of the market to the updated price may be observed to drive a learning algorithm (e.g., a supervised learning model) designed to inform current and future price updates. Such learning may then be used to update the one or more models described herein to perform a better estimation of at time at which a price should be changed.

By way of example, embodiments described herein are configured to determine one or more price adjustable promotions (e.g., a promotion that is eligible for price adjustment) and, for those one or more price adjustable promotions, determine an updated or otherwise changed price. In order to make such a determination one or more factors may be considered. In some example embodiments, those factors may include, but are not limited to, a forecasted demand for a price adjustable promotion and/or a current or historical reaction of the market to the promotion and/or a related promotion. Other factors that may also be considered include, but are not limited to, category, sub-category or service level identification of the promotion, category of the merchant, location, price and/or the like.

In some example embodiments, a time at which a price is to be adjusted may be determined. The time at which a price change may occur is defined based on the perishable inventory of a particular promotion and the velocity at which the promotion is being sold. For example, a promotion that is selling quickly may sell out before a price can be adjusted. In some cases, additional units of the promotion may not be available. As such, the methods, apparatus and computer program product described herein provide one or more time metrics (e.g., prior to launching a promotion, at a promotion price change time in a promotion sales cycle, at a revenue maximization time and/or the like) that are indicative of the time at which a promotion price is to be changed. For example, the decision on price may need to be made prior to launch of the promotion, whereas in other examples the price change may need to be changed before 10% of the inventory has been sold.

In further example embodiments, a promotion and marketing system may identify a price adjustable promotion having a first promotional price, access related promotion data, and determine a second promotional price at which to offer the price adjustable promotion. The calculation of the second promotional price may include factors such as a forecasted demand, a remaining inventory of the promotion and estimated revenue. For example, based on the forecasted demand, a remaining inventory of the promotion and estimated revenue, a price adjustable promotion may be offered at a second promotional price at a next time that the promotion price can be adjusted and before a promotion sells out.

In further example embodiments, a promotion that receives a price adjustment may not receive a change to one or more redemption parameters related to the promotion. In particular, a promotion (e.g., $25 for $50 toward running shoes) may be adjusted to $35 for $50 toward running shoes. In such cases, one or more redemption parameters for the promotion may not change (e.g., expiration date, promotional value, constraints, limitations, rules or the like for how and/or when an instrument may be redeemed or the like). Whereas in other example embodiments, a first promotion (e.g., $25 for $50 toward running shoes) may be discontinued or otherwise cancelled and a second promotion (e.g., $35 for $50 toward running shoes) may be created or otherwise presented to one or more consumers.

A promotion and marketing service may include a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A provider may include, but is not limited to, a merchant, business owner, consigner, shopkeeper, tradesperson, vender, operator, entrepreneur, agent, dealer, organization, supply source or the like that is in the business of a providing a good, service or experience to a consumer, facilitating the provision of a good, service or experience to a consumer and/or otherwise operating in the stream of commerce. For example, a provider may the form of a running company that sells attire that is generally used by a person who runs or participates in athletic activities.

A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

Consumers may include, but is not limited to, a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

Redemption parameters may include, but are not limited to, parameters, bounds, considerations and/or the like that outline the term, timing, constraints, limitations, rules or the like for how and/or when an instrument may be redeemed. For example, an indication that the instrument must be redeemed prior to a specified deadline, for a specific good, service or experience and/or the like. For example, using the aforementioned running company as the example provider, a limit of one instrument per visit, in store only or an expiration of May 29, 2013.

Example System Architecture

FIG. 1 is a block diagram showing a system for use in the pricing of promotions. Pricing apparatus 100 may include a dynamic pricing module 105, a dynamic price calculator module 110, a promotion data collection module 115, a demand forecast module 120 and/or the like.

In some example embodiments, the dynamic pricing module 105 is configured for determining that a promotion may be eligible for a price adjustment (e.g., a price adjustable promotion). In some embodiments, the determination may be based on one or more of demand data being generated by a demand forecast module 120 within a predefined time window, promotion data being generated by the deal data collection module 115 within the predefined time window, and a forecasted availability of the promotion in one or more future pricing periods of the plurality of pricing periods.

In some example embodiments, inputs to the demand forecast module 120 may comprise a promotion prediction engine 125 or, in some examples, a location targeting engine (e.g., targetable user's vector (i.e. count of users, average conversion score for this promotion in (2 mi, 4 mi, 8 mi 16, 32, 64))). Another input may include previous promotion performance data 130 (e.g., impressions, clicks, purchases, orders on promotion). In some examples, website data may be utilized and configured to include one or more of email, mobile, and organic users. Another input to the demand forecast module 120 may be a promotion data 135 (e.g., promotion metadata). Static data content (e.g., category, promotion structure, zip code or the like) may be captured off the promotion catalog service. Another input may be merchant data 140 (e.g., merchant location, merchant quality score or the like). Merchant quality score is discussed further in U.S. patent application Ser. No. 13/826,866, filed Mar. 14, 2013, titled "METHOD, APPARATUS, AND COMPUTER PROGRAM PRODUCT FOR CALCULATING A PROVIDER QUALITY SCORE", which is hereby incorporated by reference.

In one example embodiment, the dynamic pricing module 105 is configured to perform a confirmation of whether a particular promotion is a price adjustable promotion. One example method for determining a price adjustable promotion includes, but is not limited to:

---

Require: launch-date, timeWindow, is-eligible, demandData, dealData, $\Phi$,
Ensure: returns boolean value: a deal price can or can't be updated.
  1:if launch-date is not "Tomorrow" then
  2:return false
  3: end if
  4: if demandData.calculatedAt < timeWindow then
  5:return false
  6: end if
  7:if dealData.calculatedAt < timeWindow then
  8:return false
  9: end if
10:if dermandData.projected_demand > p x dealData.units_remaining then
11:   return true
12: end if

--- where a demand projection factor is $\phi$.

The dynamic pricing module 105 may be further configured to cause the generation of a second promotion price for the promotion in the one or more future pricing periods in an instance in which the promotion is eligible for price adjustment.

In some example embodiments, dynamic pricing module 105 may generate a new or second price based at least in part on the following:

---

Require: dealData. minRevenueThreshold, highThreshold. mediumThreshold
Ensure: list with newPledgePrices
  1:    for pledge in dealData.getPledges( ) do
  2:      if pledge.is_eligible_dynamic_pricing != true then -continued

```
3:       continue
4:    end if
5:    if
```
$$\frac{(pledge \cdot unitsTotal - pledge \cdot unitsRemaining)}{pledge \cdot unitsTotal} > highThreshold$$
```
      then
6:       newPrice.price = GETPRICEACTION(pledge.price, "high")
7:
```
$$newPrice \cdot \text{unit\_buy\_price} = newPrice \cdot price \times \left(\frac{pledge \cdot \text{unit\_buy\_price}}{pledge \cdot \text{unit\_price}}\right)$$
```
8:       estimatedRevenue = pledge.unitsRemaining × newPrice.price
9:       if estimatedRevenue > minRevenueThreshold then
10:         newPledgePrices.add(pledge, newPrice)
11:      end if
12:   end if
13:   if
```
$$\frac{(pledge \cdot unitsTotal - pledge \cdot unitsRemaining)}{pledge \cdot unitsTotal} > mediumThreshold$$
```
      then
14:      newPrice.price = GETPRICEACTION(pledge.price, medium)
15:
```
$$newPrice \cdot \text{unit\_buy\_price} = newPrice \cdot price \times \left(\frac{pledge \cdot \text{unit\_buy\_price}}{pledge \cdot \text{unit\_price}}\right)$$
```
16:      estimatedRevenue = pledge.unitsRemaining × newPrice.price
17:      if estimatedRevenue > minRevenueThreshold then
18:         newPledgePrices.add(pledge. newPrice)
19:      end if
20:   end if
21: end for
22: return newPledgePrices
``` where A is a discrete set of possible actions to change the price (e.g. higher price, lower price, medium price, etc.), and F is a set of possible price changes related to each one of the previous actions (e.g., a mathematical factor such as, but not limited to, addition, subtraction, multiplication or the like). In one embodiment, A={high, medium} and F={highPriceFactor, mediumPriceFactor}.

In one example embodiment, the dynamic pricing module 105 may be configured to call the following in an instance in which a price is determined to be changed:

```
Require: Price p, α ∈ A, F
Ensure: updated price p*
1: if α = = "high" then
2:    return p* = p × highPriceFactor
3: end if
4: if α = = "medium" then
5:    return p* = p × mediumPriceFactor
6: end if
```

In one embodiment, where the condition $$\lim_{\epsilon \to 0}\left(pledge \cdot \frac{unitsRemaining}{pledge \cdot unitsTotal} \cdot - \epsilon\right) = 1 \text{ holds,}$$

then the other pledges are very popular and a particular pledge is unpopular (since the deal will not sell out), in such an example case a price may not be increased, changed or the like.

In some example embodiments, the dynamic price calculator module 110 may be configured to generate the second promotion price based on an indication provided by the dynamic pricing module 105. In some example embodiments, the dynamic price calculator module 110 may further be configured to compare a promotion quantity factor to a first pricing threshold value, wherein in an instance in which the promotion quantity factor satisfies the first pricing threshold value generating a second promotion price for the promotion as a function of a first pricing factor and a margin value generated by the first promotion price.

In some example embodiments, the dynamic price calculator module 110 may further be configured to compare a promotion quantity factor to a second pricing threshold value in an instance in which the promotion quantity factor does not satisfy the first dynamic pricing threshold value. In some embodiments, wherein in an instance in which the promotion quantity factor satisfies the second pricing threshold value, the dynamic price calculator module 110 may be configured for generating a second promotion price as a function of a second pricing factor and a margin value generated by the first promotion price.

In some example embodiments, the promotion data collection module 115 may be configured to access promotion data for the promotion. In some embodiments, the promotion data includes a quantity of units offered via the promotion and a first promotion price. In some example embodiments, the demand forecast module 120 may be configured for causing the processor to request data related to the promotion from the promotion data collection module 115 and generating demand data that is indicative of the probability that the promotion will sell out. Further discussion may be found in U.S. patent application Ser. No. 13/826, 333, filed Mar. 14, 2013, titled "METHOD, APPARATUS, AND COMPUTER PROGRAM PRODUCT FOR DEMAND FORECASTING, which is hereby incorporated by reference. In some embodiment, pricing apparatus 100 may additionally include promotion prediction engine 125, previous promotion performance data 130, promotion data 135, merchant data 140 or the like. Promotion prediction engine 125 may be configured to provide one or more promotions. Further discussion of smart deals is provided in U.S. patent application Ser. No. 13/411,502, filed Mar. 2, 2012, titled "RELEVANCE SYSTEM FOR CONSUMER DEALS", which is incorporated by reference.

Dynamic Pricing

FIGS. 2-11 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions.

Figure 13:
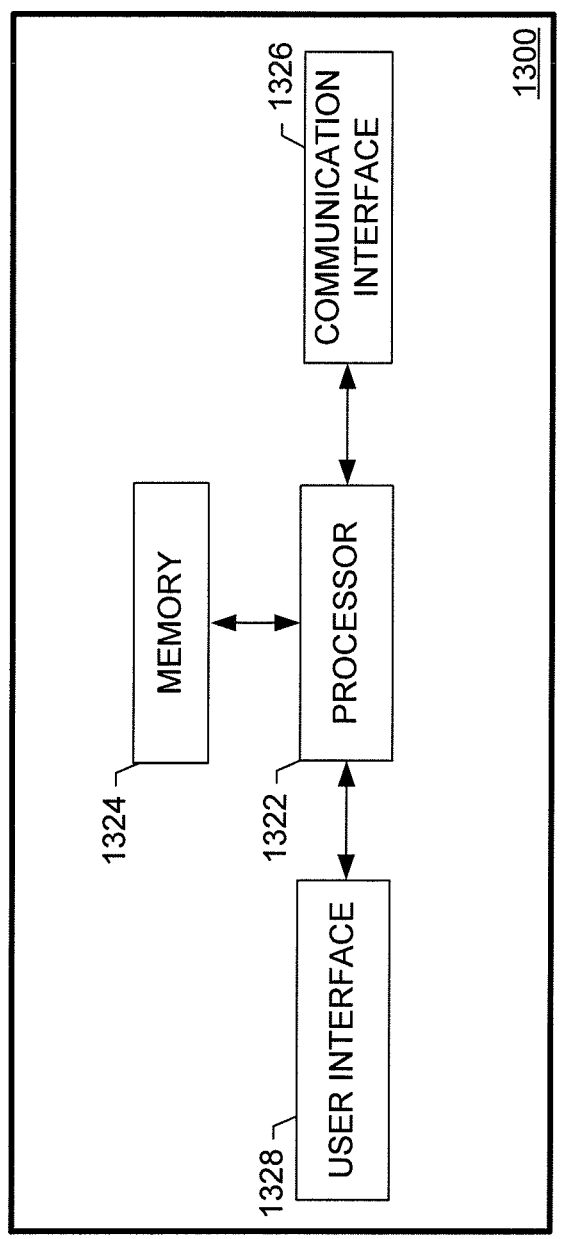
FIG. 13 is a block diagram of an apparatus that may be specifically configured in accordance with an example embodiment of the present invention.

For example, in reference to FIG. 13, one or more of the procedures described herein may be embodied by computer program instructions. In this regard, the computer program instructions which embody the procedures described above may be stored by a memory 1324 of an apparatus employing an embodiment of the present invention and executed by a processor 1322 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2-11 when executed, convert a computer or processing circuitry into a particular machine configured to perform an example embodiment of the present invention. Accordingly, the operations of FIGS. 2-11 define an algorithm for configuring a computer or processing to perform an example embodiment. In some cases, a general purpose computer may be provided with an instance of the processor which performs the algorithms of FIGS. 2-11 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments, additional optional operations may also be included. It should be appreciated that each of the modifications, optional additions or amplifications below may be included with the operations above either alone or in combination with any others among the features described herein.

High Level Exemplary Process Overview

Figure 2:
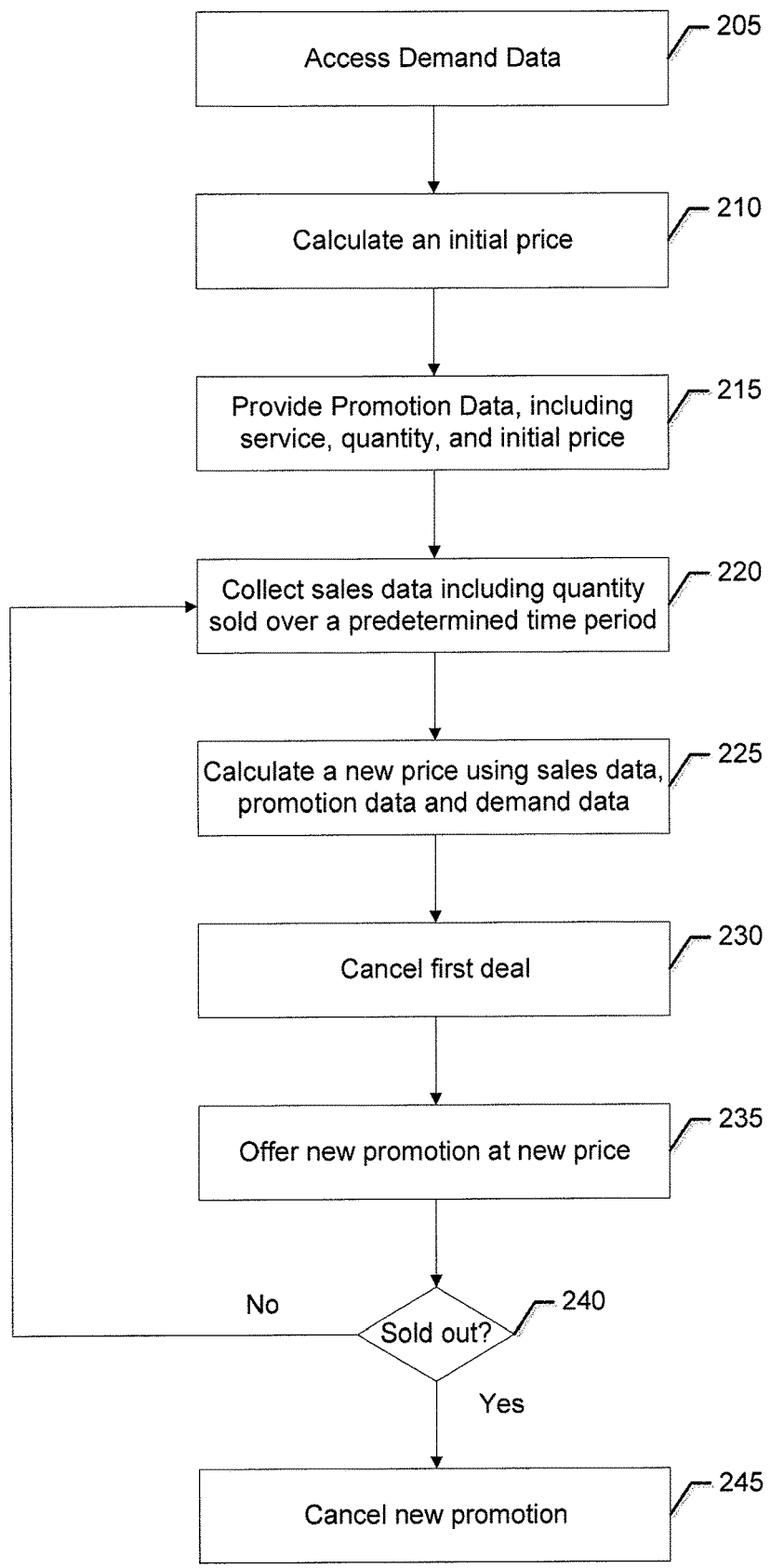
FIG. 2 is a flowchart illustrating a method for facilitating dynamic pricing of a promotion in accordance with an example embodiment.

FIG. 2 shows an example method that may be executed by one or more machines, for example by the pricing apparatus 100 of FIG. 1, for facilitating dynamic pricing of a promotion, in accordance with some embodiments discussed herein. As shown in block 205 of FIG. 2, an apparatus, such as a pricing apparatus 100, may be configured for accessing demand data of a promotion.

As shown in block 210 of FIG. 2, an apparatus, such as a pricing apparatus 100, may be configured to, calculate an initial price. As shown in block 215 of FIG. 2, an apparatus, such as pricing apparatus 100, may be configured for provide promotion data to a promotional system.

As shown in block 220 of FIG. 2, an apparatus, such as pricing apparatus 100, may be configured for accessing or collecting sales data including a quantity sold over a predetermined time period. As shown in block 225 of FIG. 2, an apparatus, such as pricing apparatus 100, may be configured for calculating a new price.

Alternatively or additionally, in some embodiments, as shown in block 230 of FIG. 2, an apparatus, such as pricing apparatus 100, may be configured for canceling or discontinuing a promotion offered at a previous price. Furthermore, in some embodiments, as shown in block 235 of FIG. 2, an apparatus, such as pricing apparatus 100, may be configured for generating, offering, or providing a new promotion at the new price. In some embodiments, as shown in block 240 of FIG. 2, an apparatus, such as pricing apparatus 100, may be configured for determining if the promotion is sold out.

In an instance in which the promotion is not sold out, the process may proceed to step 220, for accessing or collecting sales data. In an instance in which the promotion is sold out or has less than a predetermined threshold amount of units left, the process may proceed to step 245. As shown in block 245 of FIG. 2, an apparatus, such as pricing apparatus 100, may be configured for canceling the new promotion.

Generating a Second Promotional Price for a Price Adjustable Promotion

Figure 3:
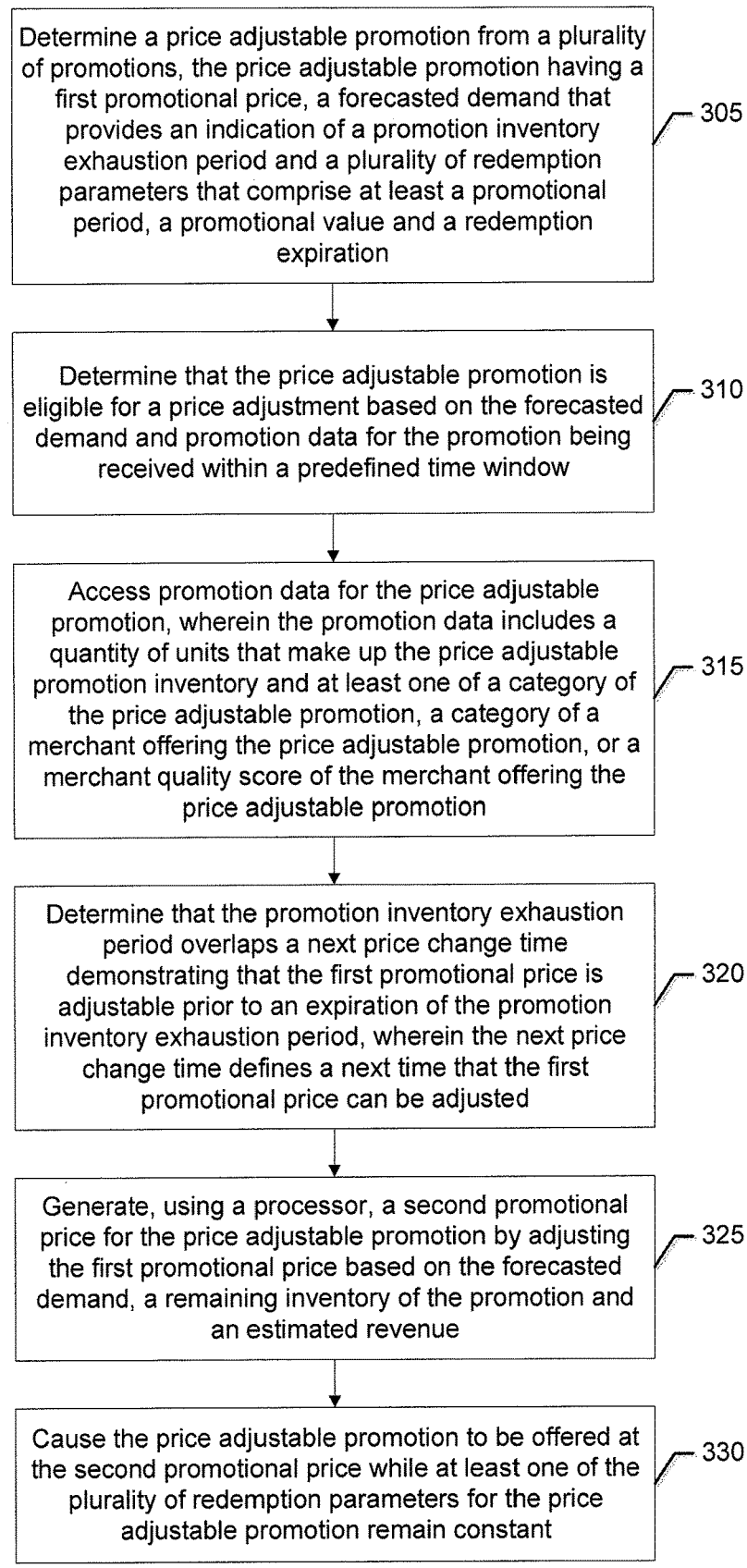
FIG. 3 is a flowchart illustrating a method for generating second promotional price for a price adjustable promotion in accordance with an example embodiment.

FIG. 3 shows an example method that may be executed by one or more machines (some examples of which are discussed in connection with FIGS. 1 and 13) to generate a second promotional price for a price adjustable promotion, in accordance with some embodiments discussed herein.

Figure 4:
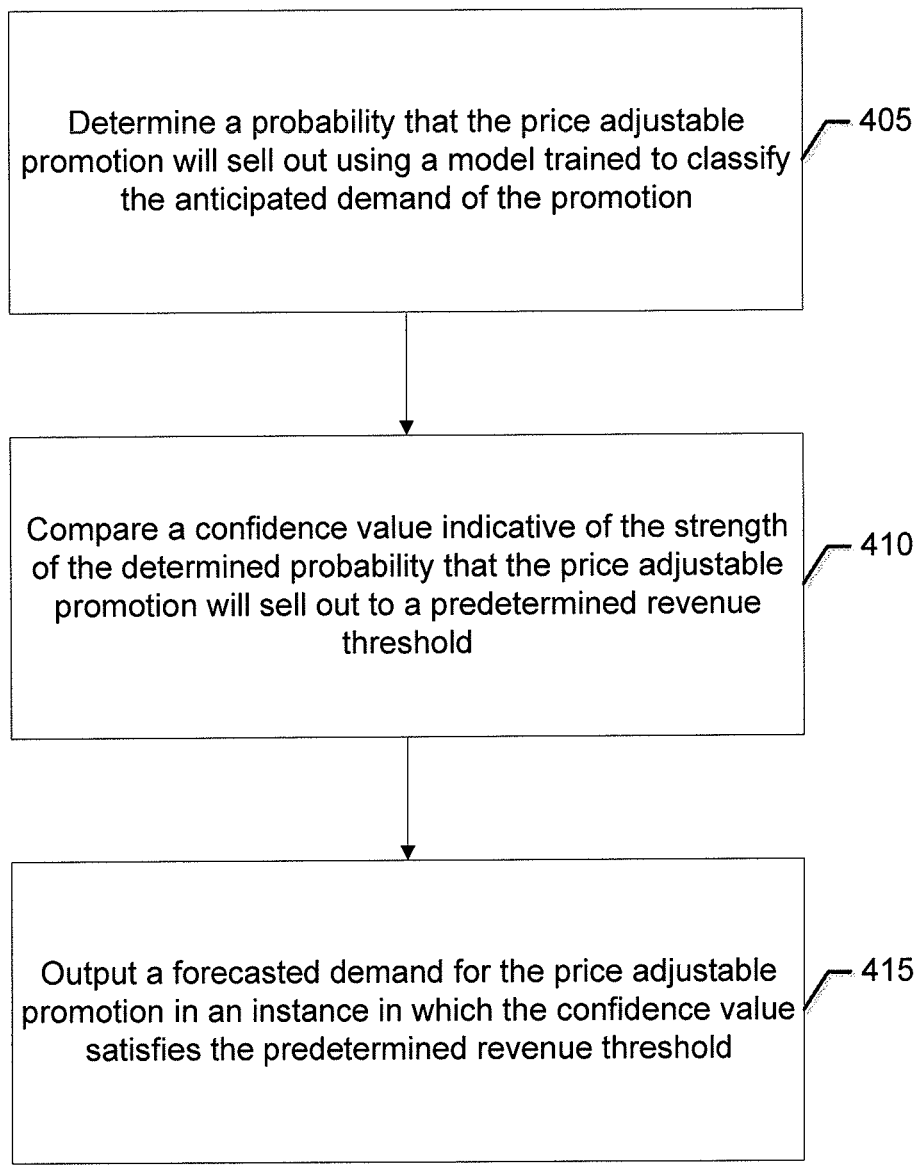
FIG. 4 is a flowchart illustrating a method for generating a forecasted demand in accordance with an example embodiment.

As shown in block 305 of FIG. 3, an apparatus, such as a pricing apparatus 100, may be configured for determining a price adjustable promotion from a plurality of promotions. In some embodiments, the price adjustable promotion comprises one or more of a first promotional price, a forecasted demand and a plurality of redemption parameters. The forecasted demand may provide an indication of a promotion inventory exhaustion period. The redemption parameters may include at least a promotional period, a promotional value and a redemption expiration. FIG. 4 shows an example process for generating a forecasted demand.

In some embodiments, determining a price adjustable promotion from a plurality of promotions may include determining whether each of one or more price adjustable promotions may be eligible for a price adjustment. As such, as shown in block 310 of FIG. 3, an apparatus, such as a pricing apparatus 100, may be configured for determining that the price adjustable promotion is eligible for a price adjustment. In some embodiments, the determination may be based on the forecasted demand and/or promotion data for the promotion being received within a predefined time window.

For example, the apparatus may be configured to determine whether a launch date for a promotion is, for example, tomorrow. If the apparatus determines that the launch date is not during a predefined time frame, the promotion may not be eligible for a price adjustment. In another example, if the demand data and/or the promotion data is not calculated within a predefined time window, the promotion may not be eligible for price adjustment. In another example, if the projected demand is higher or lower than a particular percentage of units remaining, the promotion may be determined to be eligible for price adjustment.

As shown in block 315 of FIG. 3, an apparatus, such as a pricing apparatus 100, may be configured for accessing promotion data for the price adjustable promotion. The promotion data may include a quantity of units that make up the price adjustable promotion inventory. The promotion data may further include at least one of a category of the price adjustable promotion, a category of a merchant offering the price adjustable promotion, or a merchant quality score of the merchant offering the price adjustable promotion, a service, a location or the like.

Figure 5:
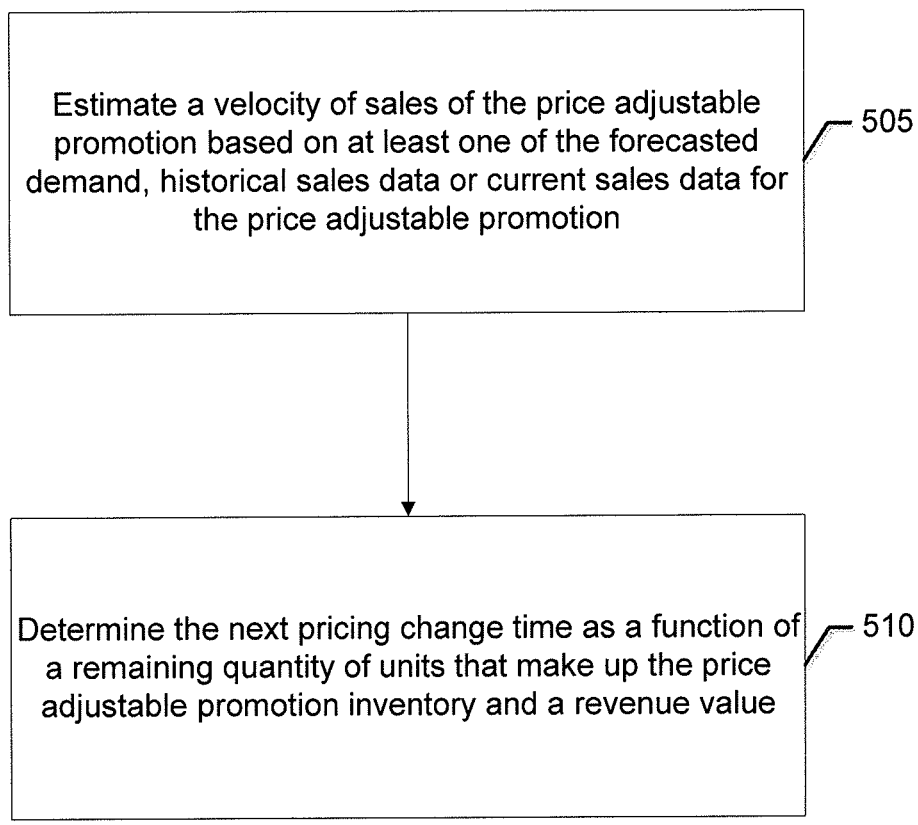
FIG. 5 is a flowchart illustrating a method for determining a next pricing change time, in accordance with an example embodiment.

As shown in block 320 of FIG. 3, an apparatus, such as a pricing apparatus 100, may be configured for determining that the promotion inventory exhaustion period overlaps a next price change time demonstrating that the first promotional price is adjustable prior to an expiration of the promotion inventory exhaustion period. In some embodiments, the next price change time may define a next time that the first promotional price may be adjusted. In one embodiment, the next pricing change time is a function of a next communication to one or more consumers that indicates a promotional price for the price adjustable promotion. In another embodiment, next pricing change time is a time at which the price adjustable promotion is first offered via the promotion service. FIG. 5 shows an example method of generating a next pricing change time.

As shown in block 325 of FIG. 3, an apparatus, such as a pricing apparatus 100, may be configured for generating, using a processor, a second promotional price for the price adjustable promotion. The generation may include adjusting the first promotional price based on at least one of the forecasted demand, a remaining inventory of the promotion and/or an estimated revenue.

As shown in block 330 of FIG. 3, an apparatus, such as a pricing apparatus 100, may be configured for causing the price adjustable promotion to be offered at the second promotional price. In some embodiments, at least one of the plurality of redemption parameters for the price adjustable promotion may remain constant.

Generating a Forecasted Demand

FIG. 4 shows an example method that may be executed by one or more machines (some examples of which are discussed in connection with FIGS. 1 and 13) to generate a forecasted demand, in accordance with some embodiments discussed herein.

As shown in block 405 of FIG. 4, an apparatus, such as a pricing apparatus 100, may be configured for determining a probability that the price adjustable promotion will sell out using a model trained to classify the anticipated demand of the promotion.

In one embodiment, the probability that the price adjustable promotion will sell out is based on a pre-feature of the promotion and a calculated intensity of the demand for the promotion during the pre-feature. In another embodiment, wherein the probability that the price adjustable promotion will sell out is based on historical data for the promotion or based on historical data for one or more other similar promotions.

As shown in block 410 of FIG. 4, an apparatus, such as a pricing apparatus 100, may be configured for comparing a confidence value indicative of the strength of the determined probability that the price adjustable promotion will sell out to a predetermined revenue threshold.

As shown in block 415 of FIG. 4, an apparatus, such as a pricing apparatus 100, may be configured for outputting a forecasted demand for the price adjustable promotion in an instance in which the confidence value satisfies the predetermined revenue threshold.

In an example embodiment, let f be the ratio of [demand projection]/[units remaining], S the set of deals that are sold-out, and $\phi$ the demand projection factor. In one embodiment, the condition that may define whether we should update the price is $f>\phi$. In this embodiment, the probability that a promotion may sell out may be estimated with, for example, $P(s \in S|f)$. Next, a probability threshold that minimizes or decreases a given objective function defined by classification performance metrics (E.g., F measure) may be determined. For example, assume a model $\mathcal{M}$ (which may be represented by alternatives such as Bayes or logistic regression) that approximates the probability $P(s \in S|f)$, then the decision to classify a promotion as "sold-out" may be taken by the following condition, $P(s \in S|f) > \tau$ where $\tau$ may be set to for example, 0.5, as a first approach. Further tuning may be done to improve classification performance or overall cost associated to the classification problem. The optimal parameter $\tau^*$ may be estimated solving the following optimization problem, $\max_\tau F(\tau)$ where $F: [0,1] \rightarrow \mathbb{R}$ is a function that describes the performance metric using $\tau$. For example, F could take the form of the F-measure computed for the classification problem using a given value for $\tau$. Also, $\min_\tau F(\tau)$ if F is a cost function that accounts for the actual revenue loss when not classifying correctly the "sold-out" or "not sold-out" deals may be solved in some example embodiments.

Independent on the approach we use to define the optimal $\tau^*$, the ultimate goal is to find the value of f that will solve the following equation $$P(s \in S|f^*) > \tau^*$$

which may define the unknown factor as $\phi = f^*$

It's important to note that if the factor is high, e.g., $\phi \gg 1$, then the condition is true only when the projected demand is much larger than units remaining. In contrast, that if the factor is high, e.g., $\phi \ll 1$, then the condition is true only when the projected demand is much smaller than units remaining.

In some examples, a mathematical representation of the demand may be considered as a function of price $p_r$. This function may be denoted by $\lambda(p_r)$. This function can be approximated by different alternatives, from deterministic and analytical expressions (e.g. linear models, exponential models, logit models, etc.) to more complex representations determined by statistical models given some training data (e.g., non-linear regressions, splines, etc.).

In this particular example, the following methods will be explained following an approximation of the demand function linear with regard to the price $p_t$.

$$\lambda(p_t) = \alpha_t - \beta_t \cdot p_t + \epsilon_t$$

Parameters $\alpha_t$ and $\beta_t$ may be determined by using historical information (e.g., previous purchases of similar promotions, dynamic deal optimization (DDO) information, etc.) using regression methods (e.g. via Least Squares) or the like. In some examples, the parameters may be updated over time. Finally, random noise may be defined as $\epsilon_t \sim N(0, \sigma_t^2)$. Further description regarding DDO may be found in U.S. application Ser. No. 13/839,360, filed on Mar. 15, 2013, entitled "DYNAMIC PROMOTION ANALYTICS", which is hereby incorporated by reference.

In some example embodiments, the value for $\sigma_t^2$ at time t may be determined via different methods, but in this particular example, such as by using Least squares. By way of example and by using the data until t−1 which was already used to determine parameters $\alpha_t$ and $\beta_t$, there are t−3 degrees of freedom.

$$\sigma_t^2 = \sum_{i=1}^{t-1} (D_i - ((\alpha_t - \beta_t \cdot p_i))^2 / (t-3))$$

Where $D_i$ is the actual demand at time i.

Determining a Next Pricing Change Time

FIG. 5 shows an example method that may be executed by one or more machines (some examples of which are discussed in connection with FIGS. 1 and 13) to determine a next pricing change time, in accordance with some embodiments discussed herein.

As shown in block 505 of FIG. 5, an apparatus, such as a pricing apparatus 100, may be configured for estimating a velocity of sales of the price adjustable promotion based on at least one of the forecasted demand, historical sales data or current sales data for the price adjustable promotion.

As shown in block 510 of FIG. 5, an apparatus, such as a pricing apparatus 100, may be configured for determining the next price change time as a function of a remaining quantity of units that make up the price adjustable promotion inventory and a revenue value. In some example embodiments, the next price change time may be based on a sales cycle (e.g., based on a time in which a next communication is published that include the promotion and its price, based on a time interval such as every 24 hours, based on a sales volume such as 10% sold or the like). In some examples, the next price change time may be based on a threshold related to an amount sold over a particular time window (e.g., 10% sold in the first two hours). As such, the next price change may be determined as the time until a price change decision is to be made.

In other example embodiments, a model may be trained based on a forecasted demand, an estimated sales velocity for a particular category, sub-category or service or the like, such that the model is configured to predict the time at which price is to be changed in order to affect buying behavior. Alternatively or additionally, by applying the model, a particular sales change time may be determined that maximizes revenue, satisfies an assumption of a sell-out and/or the like.

In some example embodiments, the time at which the price should be changed may be determined by business and technological constraints (e.g., advertising timelines, sales cycle restrictions, email marketing initiatives, business reasons and/or the like). In some examples, these constraints may be fundamentally related to the mechanisms used to collect the necessary data (e.g., demand data, sales data and/or the like) used to make the pricing decision described herein, the business strategy behind these collection mechanisms and/or the like. However, once the data is properly collected, the time for updating the price has the possibility to be determined in a static or dynamic way.

In some examples, the time for setting a price and/or dynamically changing a price may be set in a static way. For example, given historical information, an estimation of the demand may be computed and the time needed to update the price may then be determined. In some examples, static approaches may be beneficial where small sample size or unreliable real time data may adversely affect such calculations.

In some example, the time for setting a price and/or dynamically changing a price may be set in a dynamic way (e.g., based on market reactions). A dynamic system may rely on actual behavior of consumers and their purchases that is tracked in real time. As such, data may be collected incrementally to determine when to update the price. For example, in a dynamic approach, instead of deciding the amount of time in which to perform a pricing update, the decision problem may be represented by determining if, at a given moment, the price should or should not be changed.

Generating a Second Promotional Price Utilizing a Promotion Quantity Factor

Figure 6:
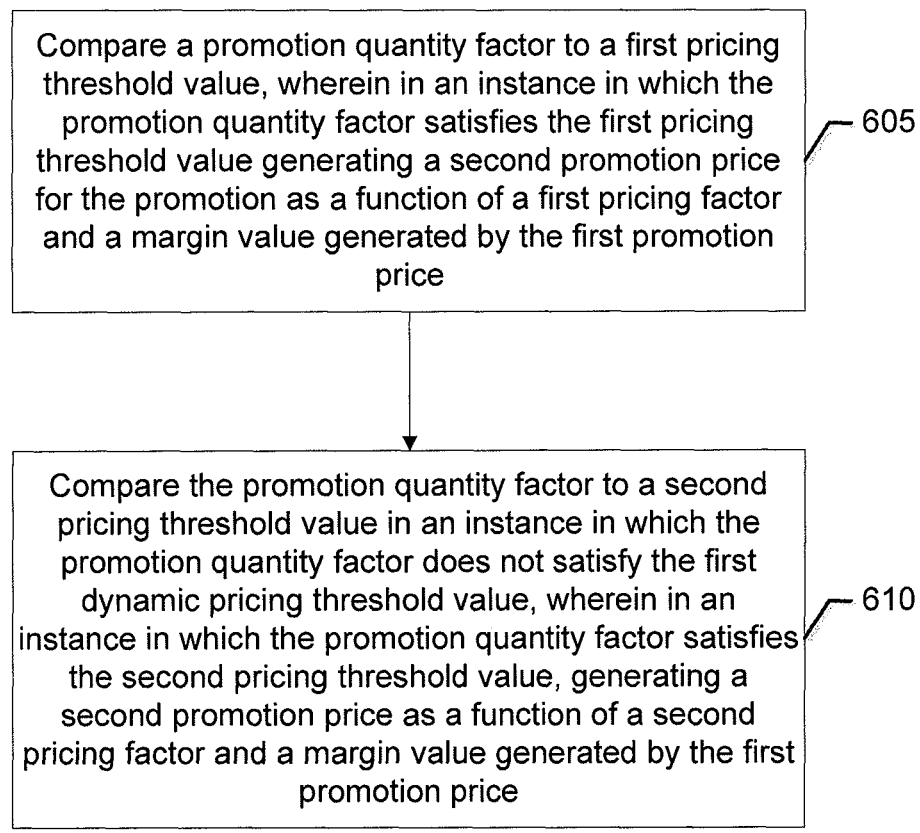
FIG. 6 is a flowchart illustrating a method for generating a second promotional price, in accordance with an example embodiment.

FIG. 6 shows an example method that may be executed by one or more machines (some examples of which are discussed in connection with FIGS. 1 and 13) to generate a second promotional price, in accordance with some embodiments discussed herein.

As shown in block 605 of FIG. 6, an apparatus, such as a pricing apparatus 100, may be configured for comparing a promotion quantity factor to a first pricing threshold value. In some embodiments, in an instance in which the promotion quantity factor satisfies the first pricing threshold value, the apparatus may be configured for generating a second promotion price for the promotion as a function of a first pricing factor and a margin value generated by the first promotion price.

As shown in block 610 of FIG. 6, an apparatus, such as a pricing apparatus 100, may be configured for comparing the promotion quantity factor to a second pricing threshold value in an instance in which the promotion quantity factor does not satisfy the first dynamic pricing threshold value. In some embodiments, in an instance in which the promotion quantity factor satisfies the second pricing threshold value, the apparatus may be configured for generating a second promotion price as a function of a second pricing factor and a margin value generated by the first promotion price.

In some examples and in an instance in which (the number of total units in a promotion−the number of units remaining in the promotion/the number of units in the promotion) satisfies the first threshold, then in some example embodiments, a first price multiplier is used. However, in an instance in which (the number of total units in a promotion− the number of units remaining in the promotion/the number of units in the promotion) satisfies the second threshold and not the first threshold, then in some example embodiments, a second price multiplier is used. In some examples, the first price multiplier is greater than the second price multiplier.

Dynamic Price Adjustment

Figure 7:
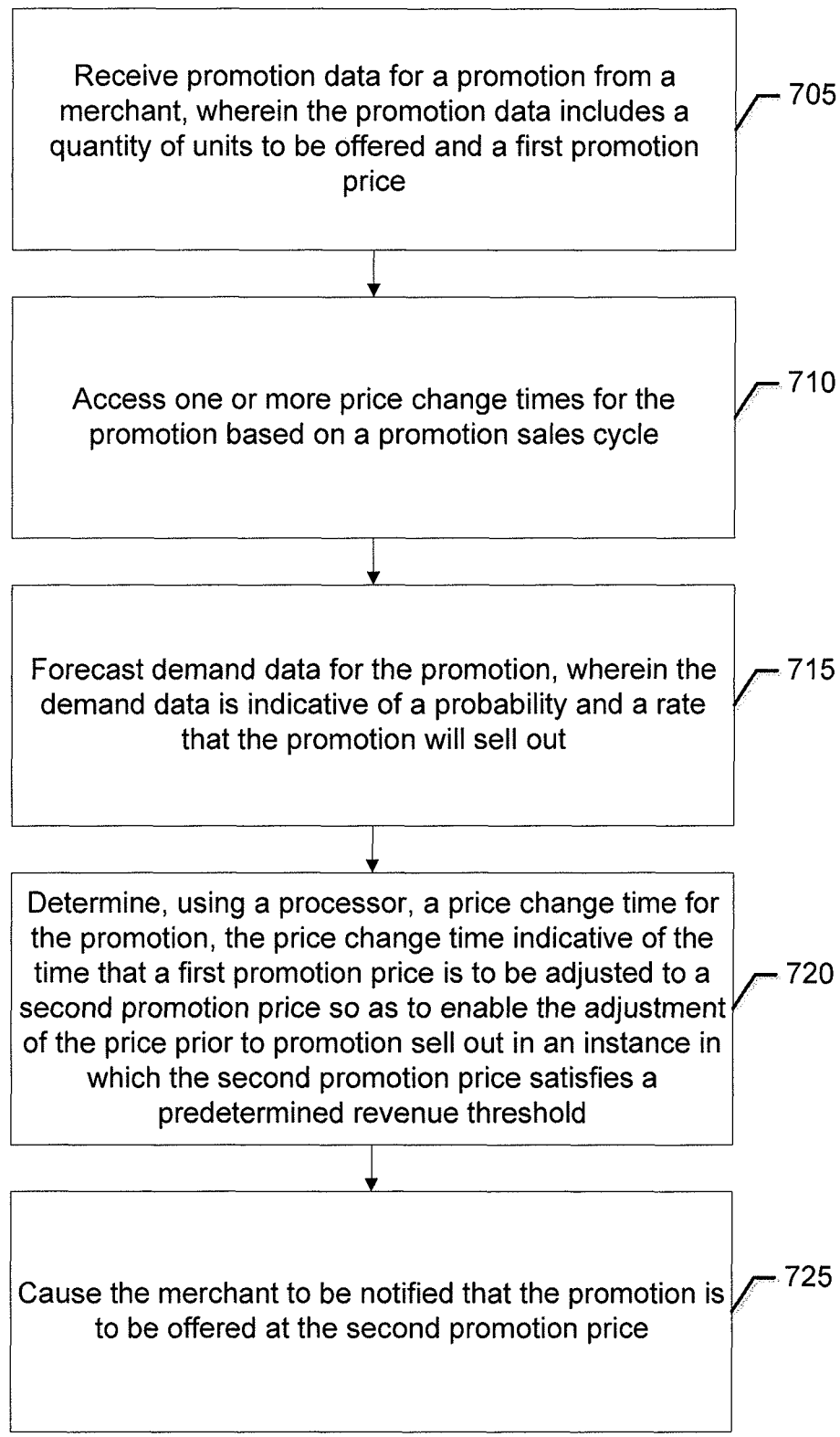
FIG. 7 is a flowchart illustrating a method for dynamic price adjustment of one or more promotions offered by a promotion service, in accordance with an example embodiment.

FIG. 7 shows an example method that may be executed by one or more machines (some examples of which are discussed in connection with FIGS. 1 and 13) for dynamic price adjustment of one or more promotions offered by a promotion service, at least one of the promotions being designed in part by a merchant via an interface, in accordance with some embodiments discussed herein. As shown in block 705 of FIG. 7, an apparatus, such as a pricing apparatus 100, may be configured for receiving promotion data for a promotion from a merchant. In some embodiments, the promotion data includes a quantity of units to be offered and a first promotion price.

As shown in block 710 of FIG. 7, an apparatus, such as a pricing apparatus 100, may be configured for accessing one or more price change times for the promotion based on a promotion sales cycle. As shown in block 715 of FIG. 7, an apparatus, such as a pricing apparatus 100, may be configured for forecasting demand data for the promotion. In some embodiments, the demand data may be indicative of a probability and a rate that the promotion will sell out.

In one example, an algorithm to predict whether a promotion will sell out may be determined by different factors that may be related to the demand forecasting approaches discussed herein. For example, by using one or more approaches (e.g., demand as a function of price, demand as a function of time, conversion rate as a function of time, conversion rate as a function of time and price, among other representations).

In some examples, the rate at which a promotion may sell out may be estimated based on one or more different rules and may be determined either in a static or dynamic way. In one example, a static approach may use historical information to estimate in advance the likelihood that the promotion will be sold out in a certain amount of time (i.e., in a defined time window). Alternatively or additionally, a static approach may provide one or more likelihood calculations based on initial sales rates (i.e., a sales velocity). For example, a likelihood of a sell out in or more or more periods of time as a function of a total amount or a percentage of sales in a first time period. In another example, a dynamic approach may, as information is collected, determine changes in the likelihood of a deal selling out. Such changes may inform price adjusting strategy.

As shown in block 720 of FIG. 7, an apparatus, such as a pricing apparatus 100, may be configured for determining, using a processor, a price change time for the promotion. In some embodiments, the price change time indicative of the time that a first promotion price is to be adjusted to a second promotion price so as to enable the adjustment of the price prior to promotion sell out in an instance in which the second promotion price satisfies a predetermined revenue threshold.

As shown in block 725 of FIG. 7, an apparatus, such as a pricing apparatus 100, may be configured for causing the merchant to be notified that the promotion is to be offered at the second promotion price.

Dynamic Pricing Via Promotion Service

Figure 8:
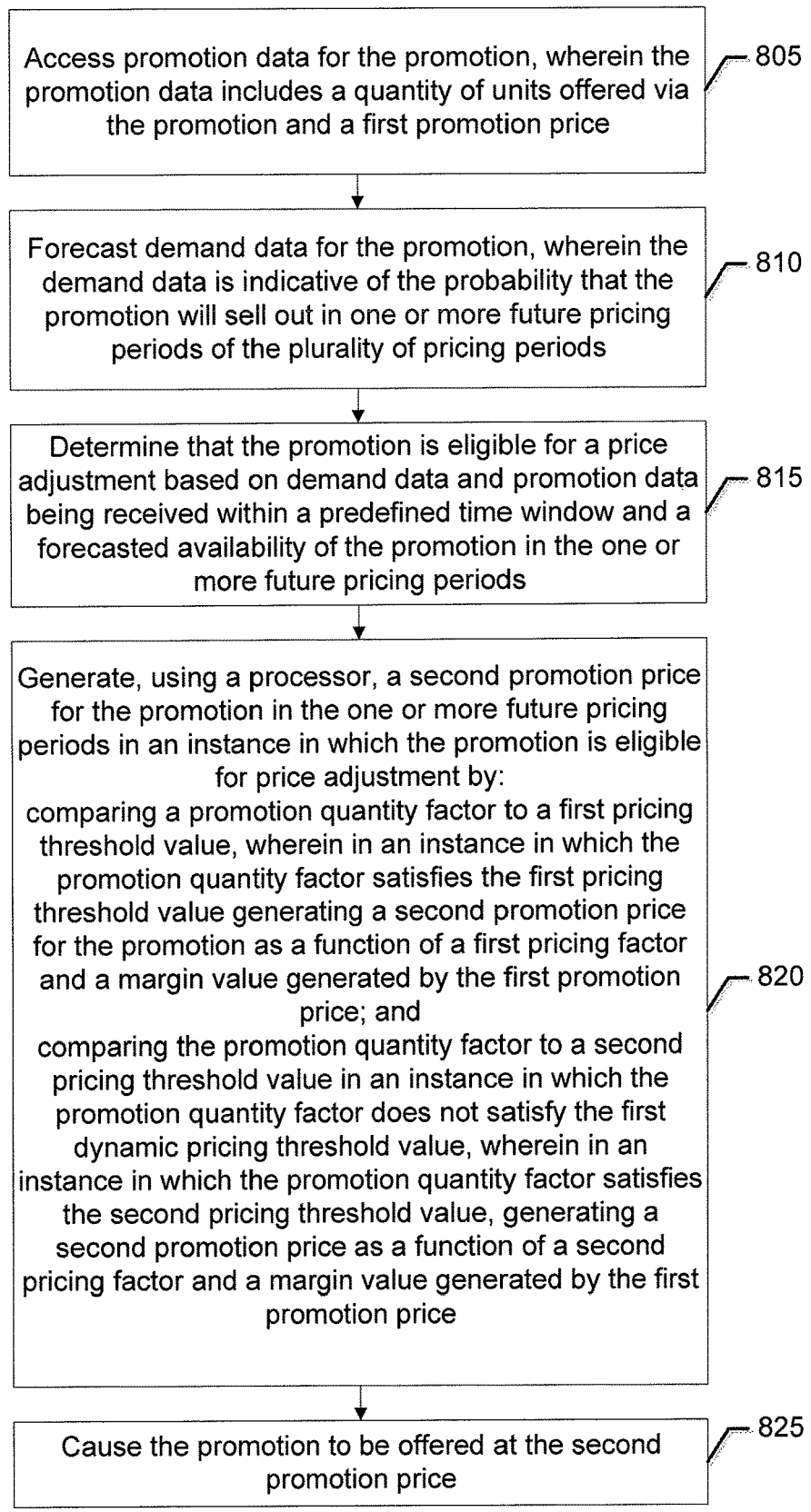
FIG. 8 is a flowchart illustrating a method for dynamically adjusting a price for a promotion offered via a promotion service, in accordance with an example embodiment.

FIG. 8 shows an example method that may be executed by one or more machines (some examples of which are discussed in connection with FIGS. 1 and 13) for dynamically adjusting a price for a promotion offered via a promotion service, the promotion service defining a promotion offering cycle using a plurality of pricing periods, in accordance with some embodiments discussed herein.

As shown in block 805 of FIG. 8, an apparatus, such as a pricing apparatus 100, may be configured for accessing promotion data for the promotion, wherein the promotion data includes a quantity of units offered via the promotion and a first promotion price.

As shown in block 810 of FIG. 8, an apparatus, such as a pricing apparatus 100, may be configured for forecasting demand data for the promotion, wherein the demand data is indicative of the probability that the promotion will sell out in one or more future pricing periods of the plurality of pricing periods.

As shown in block 815 of FIG. 8, an apparatus, such as a pricing apparatus 100, may be configured for determining that the promotion is eligible for a price adjustment based on demand data and promotion data being received within a predefined time window and a forecasted availability of the promotion in the one or more future pricing periods.

As shown in block 820 of FIG. 8, an apparatus, such as a pricing apparatus 100, may be configured for generating, using a processor, a second promotion price for the promotion in the one or more future pricing periods in an instance in which the promotion is eligible for price adjustment. In some embodiments, the generation of the second promotion price may include comparing a promotion quantity factor to a first pricing threshold value. In an instance in which the promotion quantity factor satisfies the first pricing threshold value generating a second promotion price for the promotion as a function of a first pricing factor and a margin value generated by the first promotion price and comparing the promotion quantity factor to a second pricing threshold value in an instance in which the promotion quantity factor does not satisfy the first dynamic pricing threshold value. In an instance in which the promotion quantity factor satisfies the second pricing threshold value, generating a second promotion price as a function of a second pricing factor and a margin value generated by the first promotion price.

As shown in block 825 of FIG. 8, an apparatus, such as a pricing apparatus 100, may be configured for causing the promotion to be offered at the second promotion price.

Utilizing Demand in Myopic, Semi-Myopic, or Non-Myopic Pricing Policies

Figure 9:
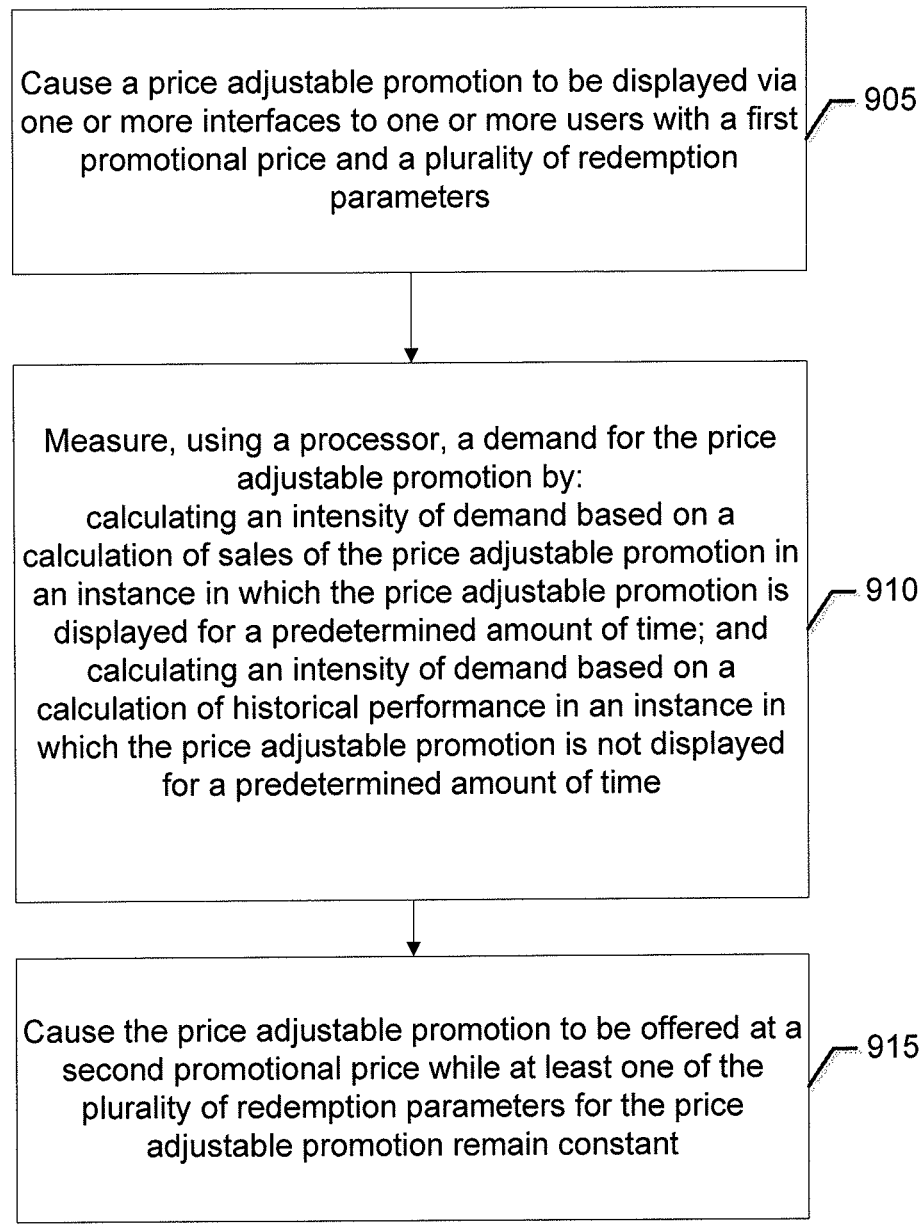
FIG. 9 is a flowchart illustrating a method for utilizing demand in myopic, semi-myopic, or non-myopic pricing policies, in accordance with an example embodiment.

FIG. 9 shows an example method that may be executed by one or more machines (some examples of which are discussed in connection with FIGS. 1 and 13) to utilize demand in myopic, semi-myopic, or non-myopic pricing policies, in accordance with some embodiments discussed herein.

As shown in block 905 of FIG. 9, an apparatus, such as a pricing apparatus 100, may be configured for causing a price adjustable promotion to be displayed via one or more interfaces to one or more users with a first promotional price and a plurality of redemption parameters.

As shown in block 910 of FIG. 9, an apparatus, such as a pricing apparatus 100, may be configured for measuring, using a processor, a demand for the price adjustable promotion. In some embodiments, measuring the demand may include calculating an intensity of demand or demand response based on a calculation of sales of the price adjustable promotion in an instance in which the price adjustable promotion is displayed for a predetermined amount of time and calculating an intensity of demand based on a calculation of historical performance in an instance in which the price adjustable promotion is not displayed for a predetermined amount of time.

As shown in block 915 of FIG. 9, an apparatus, such as a pricing apparatus 100, may be configured for causing the price adjustable promotion to be offered at a second promotional price while at least one of the plurality of redemption parameters for the price adjustable promotion remain constant.

In some embodiments, the apparatus may be further configured for causing the price adjustable promotion to be offered at the second promotional price based on a myopic pricing policy. In other embodiments, the apparatus may be further configured for causing the price adjustable promotion to be offered at the second promotional price based on a semi-myopic pricing policy. In some embodiments, the apparatus may be further configured for causing the price adjustable promotion to be offered at the second promotional price based on a non-myopic pricing policy. Details of the non-myopic pricing policy are further discussed in FIG. 10.

In an example embodiment, myopic pricing policies may be utilized where the revenue may be maximized at a given time without considering future implications of the price decisions. In this type of schema, the pricing problem may be solved, in some examples, by solving the expected revenue in the following optimization problem:

$$p_t \in \arg\max_{p \in P} p \cdot \mathbb{E}(\min(\max(\alpha_t - \beta_t \cdot p + \epsilon_t, 0), c_t))$$

where $c_t$ is the remaining capacity of promotion units at the beginning of period t and P is the set of eligible prices. In this case, the demand $\lambda(p_t)$ can or cannot be updated according to the collection of new data.

In another embodiment, semi-myopic policies are asymptotically optimal in a well-defined mathematical sense. The following semi-myopic approach may be extended in different ways. In general, semi-myopic policies may follow one or more of the following steps: (1) define the price for each deal at time t; (2) recalibrate the demand function (e.g., by using least squares (or other methods) to re-compute the parameters $\alpha_t$, $\beta_t$ and t); and (3) re-optimize the price for the next decision period based on the output of the demand function.

One difference between a semi-myopic pricing policy and the myopic pricing policy, in some examples, is that the recalibration step is considered explicitly in the algorithm. In order to take the price decision at any given time t, the demand function is re-calibrated in some examples.

In some example embodiments of non-myopic pricing, time horizons may be considered to further improve the pricing policy. Here, the actions that we will take at time t will be projected to the following periods in a way that the optimal pricing solution will consider the effect that these prices may have in in future steps.

In some example embodiments, dynamic programming approach may be used as an optimization approach that may generally be used in an instance in which actions that are taken at a given period i will affect the following periods of time t>i. As such, defining linear demand (with stochastic $\epsilon$), the pricing decision is solved, in some examples, by considering the following example dynamic programming optimization problem:

---

Require: T, P
Ensure: Pricing strategy $p_t$ for period t
1: for period $t \in \{1,...,T\}$ do
2: $J_T(C_T) = \max_{p_T} p_T \cdot \mathbb{E}[\min(\max(\alpha_T - \beta_T \cdot p_T + \epsilon_T, 0), c_T)]$, s.t. $p_T \in P$
3: for $s \in \{t, ..., T\}$ do
4:     $c_s$ = capacity at time s
5:
    $J_s(c_s) = \max_{p_s} \mathbb{E} \{p_s \cdot \min(\max(\alpha_1 - \beta_1 \cdot p_s + \epsilon_s, 0), c_s)] +$
    $J_{s-1}(c_s - \min(\max(\alpha_s - \beta_s \cdot p_s + \epsilon_s, 0), c_s)]$
6: end for
7: end for

--- where the remaining capacity is the state space, the prices are the controls, and the randomness comes from the noise f.

Non-Myopic Pricing Policy

Figure 10:
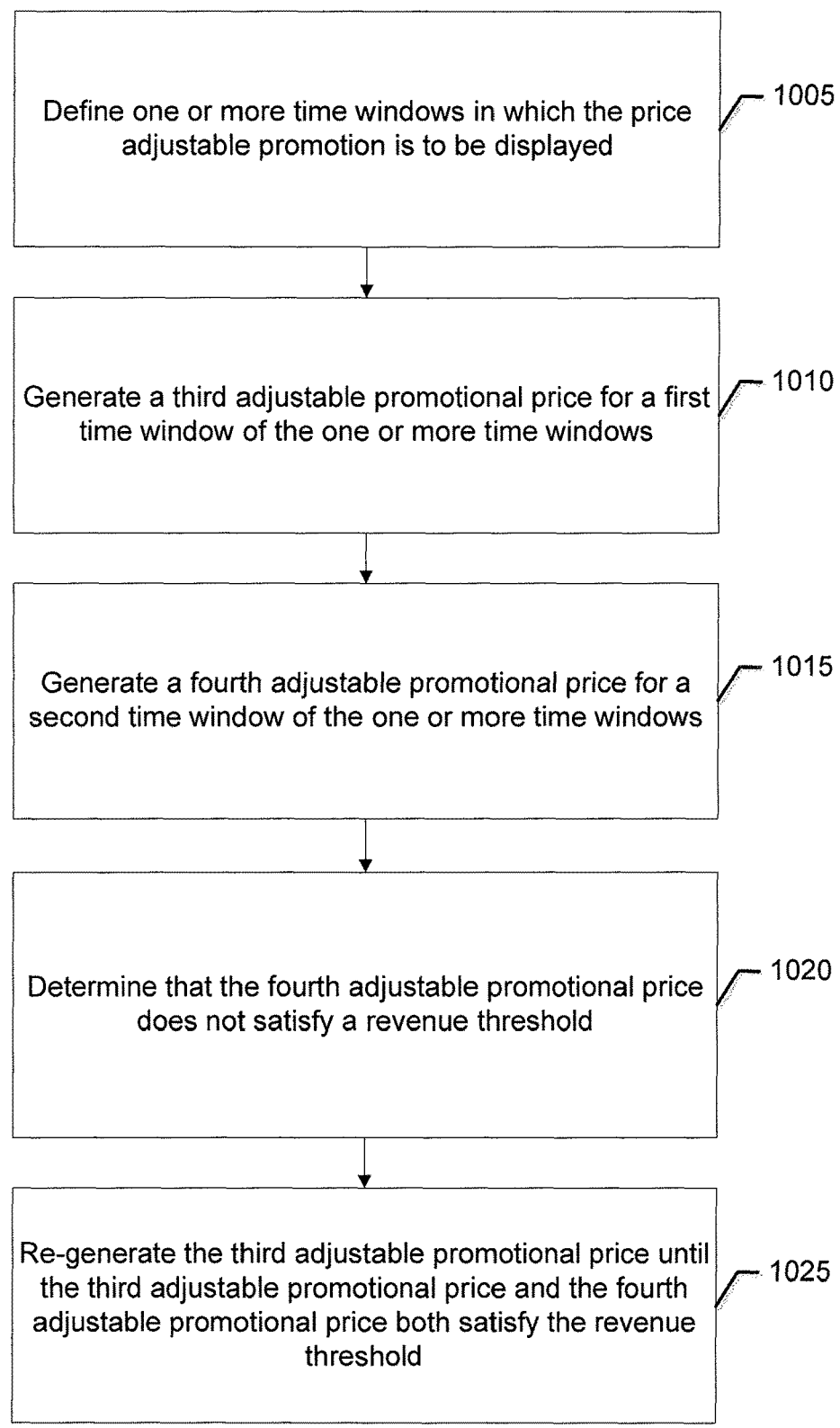
FIG. 10 is a flowchart illustrating a method for utilizing a non-myopic pricing policy in causing the price adjustable promotion to be offered at the second promotional price, in accordance with an example embodiment.

FIG. 10 shows an example method that may be executed by one or more machines (some examples of which are discussed in connection with FIGS. 1 and 13) for utilizing a non-myopic pricing policy in causing the price adjustable promotion to be offered at the second promotional price, in accordance with some embodiments discussed herein.

As shown in block 1005 of FIG. 10, an apparatus, such as a pricing apparatus 100, may be configured for defining one or more time windows in which the price adjustable promotion is to be displayed. As shown in block 1010 of FIG. 10, an apparatus, such as a pricing apparatus 100, may be configured for generating a third adjustable promotional price for a first time window of the one or more time windows.

As shown in block 1015 of FIG. 10, an apparatus, such as a pricing apparatus 100, may be configured for generating a fourth adjustable promotional price for a second time window of the one or more time windows. As shown in block 1020 of FIG. 10, an apparatus, such as a pricing apparatus 100, may be configured for determining that the fourth adjustable promotional price does not satisfy a revenue Reinforcement Learning and Optimizing in Connection with a Promotion Marketplace FIG. 11 shows an example method that may be executed by one or more machines (some examples of which are discussed in connection with FIGS. 1 and 13) to learn and optimize pricing over time, in accordance with some embodiments discussed herein.

Figure 11:
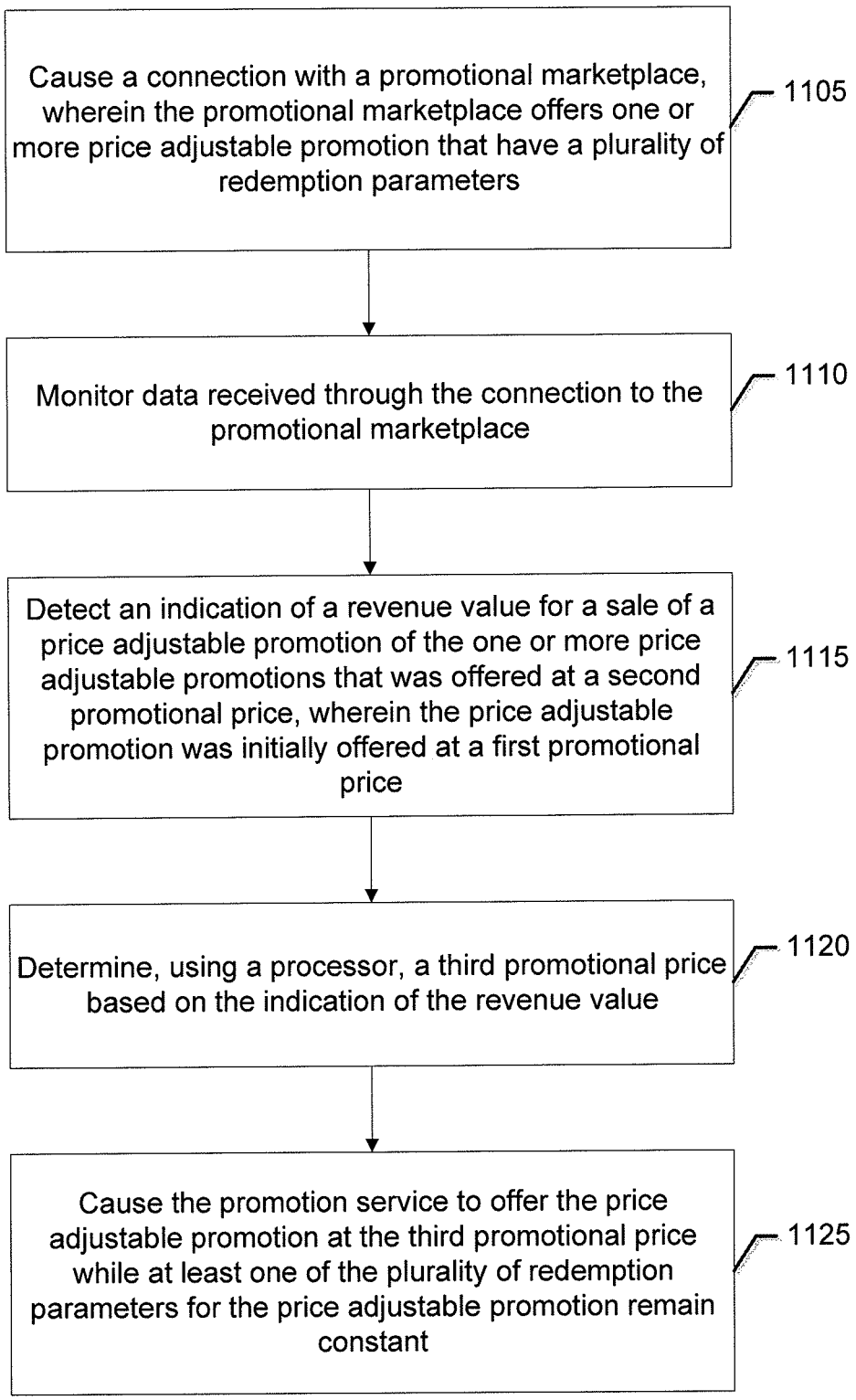
FIG. 11 is a flowchart illustrating a method for utilizing a learning and optimizing pricing model, in accordance with an example embodiment.

The method of FIG. 11, which includes learning and optimizing pricing over time, may be more generally utilized by a computational learning model (e.g., a reinforcement learning model) to determine a particular pricing policy that includes one or more of (1) when to update the price, (2) by how much should the price change, (3) the demand function, or (4) when to update the demand function. In some embodiments, the learning and optimizing process may be utilized for each of one or more variables that may have dynamic aspects related to different parts of the dynamic pricing solution described herein.

FIG. 11 shows specifically an example methodology for determining a price change amount. For example, let a particular promotion have a price $P_t$ at a given moment t. Given this particular price, the marketplace reaction may be monitored by data collection mechanisms (e.g., how many promotions are sold and how fast). Then, using these signals, the reward of setting up $P_t$ is computed and the learning algorithm is automatically updated and compared to the expected reward computed when setting up $P_t$. In one example, if the reward is higher than expected, the algorithm may have a positive reinforcement and the model may not be updated. In another example, if the reward is lower than expected, the algorithm may be updated and the variables considered in this particular representation may be adjusted for the following stage that defines the price for $P_t+1$.

In some examples, pricing policies may be determined using a set of states. In some examples, the utility (e.g., a utility function) of a given state in the set of states can be defined as the immediate reward for that state plus the expected discounted utility of the next state in an instance in which the pricing algorithm chooses an optimal action. Such a method, in some examples, may represented by the Bellman equation, (e.g., a theoretical guarantee of the convergence reaching equilibrium after updating the equation an infinite number of times).

In some examples, the utility function may be used to execute both passive and active Reinforcement Learning (RL) approaches. In some examples, passive RL is related to those instances in which the pricing policy is fixed and the learning task is to approximate the utilities of that particular policy (or state). Alternatively or additionally, passive RL may also include adaptive dynamic programming approaches or temporal difference learning, which may, in some examples, be subject to the definition of the Bellman equation, which in turn depends on the structure of the demand functions and the pricing policies or states to be defined.

On the other hand, examples of active RL are configured to determine what actions to take in order to maximize the expected utility of the pricing model. Some examples of active RL comprise exploration and/or exploitation steps, where exploration is the process used to determine optimal strategies and the exploitation step uses the determined optimal strategies so long as they remain classified as optimal. In some examples, one or more alternatives may be used for active RL. Such alternatives include, but are not limited to multi-armed bandits, Q-learning, SARSA (State-Action-Reward-State-Action models), policy search algorithms and/or the like. Alternatively or additionally, extensions of RL frameworks may include, but are not limited to, models derived from Markov Decision Processes or Partially Observed Markov Decision Processes and/or the like.

As shown in block 1105 of FIG. 11, an apparatus, such as a pricing apparatus 100, may be configured for causing a connection with a promotional marketplace, wherein the promotional marketplace (e.g., marketplace provided by a promotion and marketing service) offers one or more price adjustable promotion that have a plurality of redemption parameters.

As shown in block 1110 of FIG. 11, an apparatus, such as a pricing apparatus 100, may be configured for monitoring data received through the connection to the promotional marketplace. For example, the apparatus may be configured for receiving feedback from an interaction with a promotional system and a reward of the latest action (e.g., the outcome of the purchases of a promotion for which the price was changed and the revenue that it generated).

As shown in block 1115 of FIG. 11, an apparatus, such as a pricing apparatus 100, may be configured for detecting an indication of a revenue value for a sale of a price adjustable promotion of the one or more price adjustable promotions that was offered at a second promotional price, wherein the price adjustable promotion was initially offered at a first promotional price. As shown in block 1120 of FIG. 11, an apparatus, such as a pricing apparatus 100, may be configured for determining, using a processor, a third promotional price based on the indication of the revenue value. For example, the apparatus may be configured to determine an action for the following period, which will change the promotional system state in the following period. (e.g., determines the potential next price update for the next period).

As shown in block 1125 of FIG. 11, an apparatus, such as a pricing apparatus 100, may be configured for causing the promotion service to offer the price adjustable promotion at the third promotional price while at least one of the plurality of redemption parameters for the price adjustable promotion remain constant.

Although the examples shown in relation to FIG. 11 relate to a leaning method for determining a price or price change, one skilled in the art would appreciate that the learning and optimizing model shown below may be utilized for at least one of (1) when to update the price, (2) by how much should we change the price, (3) the demand function, and (4) when to update the demand function.

For example, demand learning may include driven methods that may update some of the parameters of the estimated functions over time. One particular example of a learning approach (e.g., using reinforcement learning), is presented in the following example steps: (1) an agent is connected to a system (e.g., a dynamic pricing algorithm is connected to the promotion and marketing service marketplace); (2) in every step, the agent receives feedback information from the interaction with the system and, optionally, a reward of the latest action. (e.g., the outcome of the purchases of a deal for which the price was changed and the revenue that it generated); (3) the agent chooses an action for the following period, which may then change the system state in the following period. (e.g., determines the potential next price update for the next period); and (4) continue (e.g., the objective of the agent is to maximize the sum of rewards).

Approaches like the ones described above may be particularly useful for a promotion and marketing service because such methods (1) consider multi-price products (e.g., multi options for every deal), (2) use demand learning based on probability of purchasing and/or probability of not purchasing (data available and accessible in production environments), and (3) consider dynamic pricing updates. In some examples, the method may also be (1) extensible to use true demand learning (e.g., reinforcement learning), and/or (2) the solution of the problem may be asymptotically optimal.

Multiday Sellout Model

Figure 12:
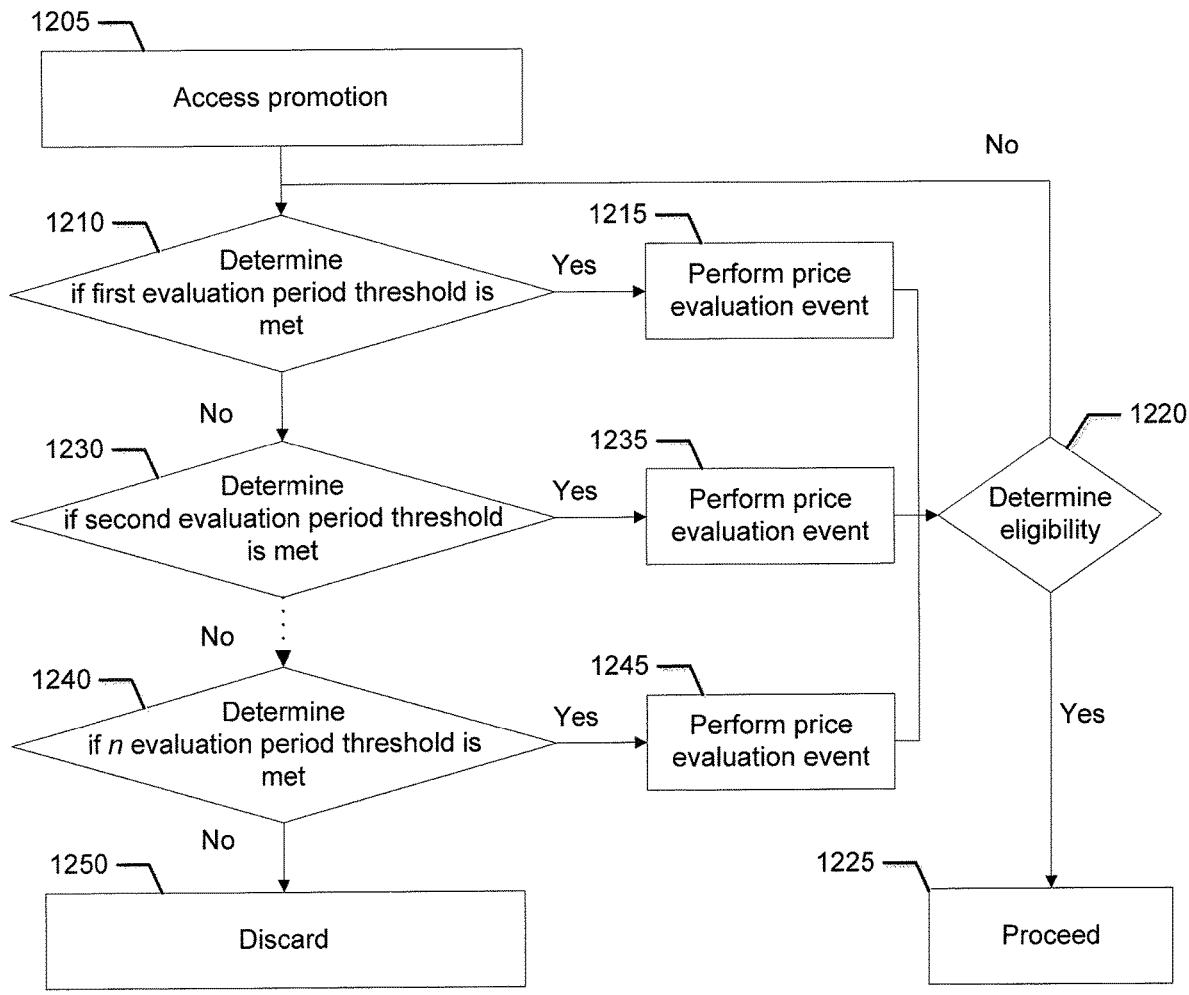
FIG. 12 is a flowchart illustrating a method for implementing a multiday sellout model, in accordance with an example embodiment

FIG. 12 shows an example method that may be executed by one or more machines (some examples of which are discussed in connection with FIGS. 1 and 13) to determine eligibility of promotions for dynamic pricing after an initial evaluation period or prefeature period, in accordance with some embodiments discussed herein. For example, in some embodiments, a multiday sellout model extends a basic sellout model, as shown with relation to for example FIGS. 2 and 4, by extending the promotion selection time window beyond a first period (e.g., the prefeature period or other evaluation period). In some embodiments, the prefeature period is a predefined first time period (e.g., day) when a promotion is available. The promotion may be promoted to a small number of users and the data collected may be used to optimize the deal on subsequent days (e.g., the feature period which may be comprised of one or more evaluation periods).

Some improvements that the multiday sellout model may provide include: (1) Improved coverage (e.g., promotions not selected during or after a first prefeature or evaluation period (e.g., a day) may be re-evaluated on subsequent days); (2) Improved sellout prediction accuracy (e.g., more sales data may be accumulated on subsequent days thus allowing for improved sellout prediction.)

In some embodiments, the basic sellout model selects a promotion option for price increase when (number of units sold)/(total inventory cap)>threshold. In some embodiments, the number of units sold may be evaluated in the basic model at the end of prefeature day or other evaluation period. For example, dependent on popularity or a rate of sales, the prefeature period and/or subsequent evaluation periods may be shorter (e.g., an hour, a half day or the like) or longer (e.g., two days, one week, or the like) The threshold may be determined through analysis of historical data such that the prediction meets the desired level of precision and recall.

In the basic model, the promotion option may not be considered for a price change again if it does not meet the threshold on the prefeature day. In the multiday sellout model, as shown for example, in FIG. 12, a multiday extension may evaluate the promotion periodically (e.g., daily) until the promotion is selected or until a set number of evaluations has occurred, whichever comes first. The selection criteria may be similar to the basic model where a promotion option may be selected when (number of units sold up to day X)/(total inventory cap)>(threshold at day X). In some embodiments, once a promotion option is selected for price change, it may not be reevaluated again.

Returning back to FIG. 12, an exemplary method is shown wherein a promotion may be evaluated for a price change after each of a plurality of evaluation periods. As shown in block 1205 of FIG. 12, an apparatus, such as a pricing apparatus 100, may be configured for accessing a promotion, promotion data or the like or otherwise selecting a promotion or promotion data for evaluation for a price change. As shown in block 1210 of FIG. 12, an apparatus, such as a pricing apparatus 100, may be configured for determining whether a first evaluation period threshold has been met. For example, the apparatus may be configured to determine whether the selected promotion has run for a first evaluation period (e.g., one day).

In an instance in which the promotion has run for the evaluation period and as such, the evaluation period threshold (e.g., >one day) has been met, as shown in block 1215 of FIG. 12, an apparatus, such as a pricing apparatus 100, may be configured for performing a price evaluation event. Subsequently, as shown in block 1220 of FIG. 12, an apparatus, such as a pricing apparatus 100, may be configured for determining the eligibility for a price change. In an instance in which the promotion is eligible for a price change, as shown in block 1225 of FIG. 12, an apparatus, such as a pricing apparatus 100, may be configured for proceeding with, for example, implementing the price change accordingly.

In an instance in which the promotion is determined not to be eligible, the process proceeds back to for example, block 1210 where it is determined that the promotion is not in the first evaluation period and is not evaluated as such, and thus the process proceeds to block 1230. As shown in block 1230 of FIG. 12, an apparatus, such as a pricing apparatus 100, may be configured for determining if the second evaluation period threshold is met. For example, the apparatus may be configured to determine if the promotion has run for two full periods of time (e.g., two days). In an instance in which the promotion has run for two periods of time, the process proceeds to block 1235. As shown in block 1235 of FIG. 12, an apparatus, such as a pricing apparatus 100, may be configured for performing the price evaluation event. At this point, the apparatus may be configured for using two days worth of promotion data. As shown in block 1220 of FIG. 12, an apparatus, such as a pricing apparatus 100, may be configured for, again determining eligibility of a price change. Similarly to above, if the promotion is determined eligible, the process may proceed to block 1225 where the price change may be implemented. If the promotion is again not determined eligible, the process proceeds to 1210, where it may be determined that the first evaluation period is ended, to 1230, where it may be determined that the second evaluation period is ended, and then to 1240.

FIG. 12 shows three evaluation periods, after each a promotion may be evaluated and determined if eligible for a price change. However, as designated by the dashed lines and the n evaluation period threshold determination, any number of evaluation or determination may be used and/or implemented. In some embodiments, the evaluation periods may all be the same length of time, and in some embodiments, the periods may change (e.g., increase or decrease from one to the next). The change may be predefined or be a function of the promotion data and/or some portion of the results of the price evaluation event. Accordingly, as shown in block 1240 of FIG. 12, an apparatus, such as a pricing apparatus 100, may be configured for determining if an n evaluation period threshold has been met. Subsequently, as shown in block 1245 of FIG. 12, an apparatus, such as a pricing apparatus 100, may be configured for performing a price evaluation event. Again as described above, the promotion may be determined eligible or not eligible. In an instance in which the promotion is determined not eligible and all the evaluation periods have been evaluated, the process may proceed to block 1250. As shown in block 1250 of FIG. 12, an apparatus, such as a pricing apparatus 100, may be configured for discarding the promotion from the the multiday sellout model shown in FIG. 12.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Additional Embodiments and Use Cases

In one embodiment, a system, such as that shown in FIG. 1 or a portion thereof, to algorithmically change the price of a deal (e.g., a promotion) for all customers (e.g., consumers) based on factors such as for example, supply and demand may be provided herein. The system may, in some embodiments, be configured to increase (e.g., maximize) gross revenue by periodically adjusting a price for each promotion while maintaining one or more predetermined target margins.

In one example embodiment, the system is configured to provide at least one of (1) more unit sales for each promotion; (2) an increased number of bookings and/or gross revenue; (3) increased margins for one or more popular promotions (e.g., those promotions having a predefined number of bookings or other sales related metric); and (4) more commerce, for example, on the promotion and marketing service platform.

In one example embodiment, each day, the system may be configured to determine whether the price of a promotion should change based on factors such as remaining inventory, time to expiration, and remnant demand. One or more price may increase, decrease, or stay constant. In some examples, price may change for each promotion in small increments. (such as $1 or $2). Promotions may have their price increased (i.e. a mark-up) or decreased (i.e. a mark down).

In some example embodiments, dynamic pricing may be implemented in a plurality of ways. For example, a (1) make the "unit_price" value in deal_options dynamic; (2) create new deal_options dynamically for the promotion and move inventory from older priced deal_options to emulate price changes; and (3) change the unit_buy_price in existing campaign pledges. In one example embodiment, per each time period, (e.g., every day, every week of the like), the system may look at dynamic deal optimization data for newly launched promotions (e.g., a promotion having been offered or available for less than a predefined period of time) and for promotions with strong demands (such as those promotions expected to sell out when compared with other promotions). Subsequently, the system may create a new promotion-option (pledge) with increased prices and expire/sell-out or otherwise cancel the current promotion-option(pledge).

In some examples, a pricing update may be performed by, for example, (1) a dynamic pricing calculator service (DPC) (which in one example, may be running in batch on top of related application (e.g., existing smart deals, daily or dynamic deal optimizer (DDO), an experimentation platform and/or the like) which calculates price changes (running per a period of time (e.g., per hour)); (2) DPC may then push updates to a message bus; (3) a pricing update service consumes the message bus and for each pricing update (a) may update the PWA campaign_pledges table directly and/or (b) save the record into a pricing table. The table may be for example, of form (deal_id, deal_option_id, timestamp, updated_price); and (4) a data warehouse may be configured to importing the pricing table In some examples, a Dynamic Price Service (DPS) may be utilized to expose a new service focused on answering all price related use cases for a promotion and marketing system. In some embodiments, (1) a promotion page (e.g., promotion page/Mobile or the like) may call a pricing service for real time true prices; (2) data may be consumed off a pricing service to, for example, have correct historical information of price changes; (3) a pricing service may be configured to handle price variations based on (a) time which may enable (i) dynamic pricing based on supply/demand; and/or (ii) discount on specific promotions to generate burst in demand (e.g. to sell more "food and drink" or the like); (b) users including (i) new users vs. repeat user price; (ii) discount for specific users on specific promotions; and (iii) activations; (c) a promotion time window for use in for example, yield management; (d) promotion locations; and (e) product traits (e.g., goods, services or experiences) which may include different prices for different colors.

In one embodiment, a number of, for example, promotions may not change due to price, (e.g. price is may be a small or non-conclusive factor in smart promotions scoring). Alternatively or additionally, regarding historical promotion performance data, a supervised model may be used. One or more supervised models that may be used, include, but are not limited to (1) Kalman filters: for example, Kalman filters with a Bayesian prior based on Promotion-metadata+Targetable vector may be utilized. Kalman filters may work with the noise in promotion performance data and are pretty robust with uncertainty. Use of a Kalman filter may have the added advantage that the model becomes real-time and may be used to move from once a day calculation to more periodic very quickly; (2) Naive-Bayes/linear regression model; (3) Support Vector Regression; (4) Lasso; (5) Gaussian Processes; (6) Ensemble methods (multiple regression models, bagging approaches); and (7) MARS.

In some embodiments, a dynamic pricing system, method, apparatus, or computer program product may allow price differentiation with respect to one or more specific customers, or group of customers sharing, for example, a specific characteristic or characteristics (e.g., zip code). To accomplish this, price elasticity of customers may be determined in pre-processing, such as for example, through testing, historical knowledge, identification of elasticity of demand for certain services within a defined service taxonomy, location and/or the like.

In one example embodiment of testing, testing dynamic pricing may utilize a large number of promotions presented to customers at 2 or more price points each. An architecture may be utilized that supports multiple price points. Such architecture may include one or more of (1) Promotion Page Details—Editorial often cites price in the promotion text; (2) Refunds By Individual Order (3) Merchant Center; (4) Accounting/Merchant Payments, such as for example, a system configured to handle variable prices and such that payments & accounting are able to be handled; (5) Sales Commissions (e.g., a system may be configured to handle calculate sales commissions with regard to variable priced promotions); (6) BI-BI tracking of these variable priced promotions; (7) A system to honor price changes if for example, someone finds a different price on the site. In another example embodiment, testing may be performed using regression on historical data to understand price point impact.

In one example embodiment, based on historical purchase data analysis, particular customers may be relatively price inelastic. For example, using particular promotions over a particular time period, and controlling for factors such as for example, Dollar Discount, Percent Discount, DealBank enabled, Impressions, Category, Subcategory and Division, a testing pre-processing step, a relatively low average price elasticity of an average promotion. For example, a 1% change in price, may yield, on average, a 0.3% change in quantity.

In one embodiment, such analysis may hold assuming that dollar discount/percentage discount and impressions holds constant as price changes on a promotion. Results are similar when targeting QPM. In some embodiments, pre-processing analysis may indicate opportunity to drive more sales by identifying and/or cutting promotion prices that provide an increased source of opportunity for return on investment (ROI) on dynamic pricing. Additionally or alternatively, the system may raise price on supply-constrained promotions. For example, raising prices on popular promotions may capture more revenue and improve margins for, for example, highly ranked merchants (e.g., based on merchant quality score). In one embodiment, if particular customers are relatively price in-elastic, the system may be able to push higher price points (assuming equal or near equal promotion quality) and in turn, may not suffer equivalent losses in quantity. In some example embodiments, such execution may provide that margin may be incorporated into a demand forecasting engine to, for example, promote higher margin and higher price point promotions. Additionally or alternatively, margin may be incorporated into a dynamic pricing algorithm.

In some embodiments, to, for example, understand price elasticity of promotions on a promotion and marketing system, analysis may be configured to be performed on particular promotions over a particular time period. One or more particular factors including a price discount (e.g., by a specific amount), a percent discount (e.g., by a specific percentage), DealBank enabled, impressions, category, subcategory and division may be controlled. The average price elasticity of a particular promotion may then be calculated as is described herein. Deal bank is further discussed in U.S. application Ser. No. 13/460,745, filed on Apr. 30, 2012, entitled "SALES ENHANCEMENT SYSTEM", which is hereby incorporated by reference. In some embodiments, customers may be found to be relatively price inelastic.

Furthermore, analysis may be performed on promotion formats (e.g., $40 for $20, DealBank-eligible Restaurant promotion in Chicago). In some embodiments, promotions may not become price elastic when either the absolute discount or the percentage discount and the number of impressions are kept constant. In some examples, particular price points or price ranges (e.g., $1-$100) may affect elasticity of demand. Results for particular price points or price ranges may vary, such that dynamic pricing may be performed differently according to particular price points or price ranges.

In some embodiments, considering particular customers may be relatively price inelastic, methods to lower price in cases when promotions are doing badly may or may not have a positive impact on performance. In other embodiments, methods for determining when and for which promotions, raising price, when there is high demand, may be performed, because, for example, customers have shown that they are buying based on the value from some other factors such as merchant quality, location and the promotion itself. In some embodiments, a system, method, apparatus or computer program product may be implemented that only raises prices on some promotions. Alternatively, in some embodiments, a system, method, apparatus or computer program product may be implements that only lowers prices on some promotions.

In some embodiments, price elasticity may occur in other scenarios, such as for example, if impressions are impacted heavily with changing price, at high price points or with channel promotions. In some embodiments, dynamic pricing may be used as a yield management solution. For example, in some embodiments, price may be adjusted based on one or more of (1) context, (2) redemption day of week; (3) time of day; and (4) consumer's desire to use the instrument now vs. later. Such implementation may be integrated with a scheduling system and/or a point of sale (POS) system, to for example, automatically offer up available inventory (i.e. appointments or reservation slots) at a marked down (or up) price.

In some embodiments, a specific standard merchant contract may be utilized including one or more of (1) CPA (cost per acquisition); (2) Fixed revenue share percentage; and (3) Hybrid (revenue share with price increase, with a minimum floor amount per Groupon). Optionally, the specific standard merchant contract may include a default opt-in or opt-out, information indicating how to handle refunds and expired promotions, and/or merchant center changes to provide visibility and/or transparency. In some embodiments, the objective function the system may be optimizing for includes at least gross revenue (e.g., units sold×$ margin per unit). In some embodiments, the algorithmic logic to raise or lower prices for a given promotion may utilize one or more of (1) supply/demand (e.g., to increase or maximize gross revenue upon sellout); (2) margin optimization (e.g., to increase gross revenue without underselling promotions); and (3) time to expiration (e.g., to not "leave money on the table"). In some embodiments, particular business rules may be supported, for example, (1) boundaries for price changes, (2) target margins (average), and (3) overrides. For example, end of quarter "sale" of all inventory by lowering price by 5% on all or a particular subset of promotions.

In some embodiments, a sellout model may be utilized to perform dynamic pricing. As such, promotions may be selected for a price change based on fraction sold at a predetermined time after start of prefeature or launch of promotion. For example, in an exemplary embodiment, promotions with 0.11<fraction_sold<0.14 may receive a 10% price increase and promotions with fraction_sold>0.14 may receive a 15% price increase. In some embodiments, a pre price change period may be utilized (e.g., a −1 day, where day 0=feature day) and a post change period may be utilized (e.g., post price change period: days >=1).

In some embodiments, a booking model may be implemented. A booking model may intuitively select selling-well promotions for price increase. The booking model may be configured to evaluate relative performance (e.g., by booking and/or ranking) for all the dynamic pricing eligible deals launched during a predefined time period (e.g., on the same day) and select an amount (e.g., top 20% or beyond a threshold) of promotions for a price increase, for example, during the next predefined time period (e.g., the next day). In some embodiments, promotions may be segmented by one or both category and price.

In some embodiments, a QPM Model (Conversion rate based pricing) may be implemented. In some embodiments, using conversion rate based pricing, a measurement or determination of the demand function made be made using, for example, historical data. Price may then be optimized based on this input demand function. The QPM model links the price change directly to the demand function. In some embodiments, one or both a price increase and a price decrease may be used. The demand function for each category may be estimated. Further segmentation may be used.

In one exemplary embodiment, consider a demand function Q(p) for a particular deal. Demand in our model is parameterized by the conversion rate (QPM). In the neighborhood of the initial price $p^0$ the demand function can be approximated by the first order Taylor expansion $$Q(P) \approx Q(p^0) + Q_p(p^0)(p-p^0),$$

where $Q_p$ is the first order partial derivative of Q(p) with respect to p. Under this linear model, the optimal price p* that optimizes the revenue R=p Q(p) when there is excess inventory (non-sellout) is given by $$p^* = \frac{1}{2}[p^0 - Q(p^0)/Q_p(p^0)].$$

In cases where there is limited inventory (sellout), the optimal price is $$p^* = p^0 + [C/I - Q(p^0)]/Q_p(p^0),$$

where C is the total inventory and I is the total impressions.

This formulation assumes that demand is deterministic and time invariant. To the extent that these assumptions are valid, the above equations specify the optimal price. The remaining challenge is to obtain the demand function Q(p).

A power law functional form is found to fit the observed demand function well:

$$\log(Q) = \beta^0 + \beta^1 \log(P).$$

Due to the high variance in the data, a quantile regression fit to the median is used instead of linear regression. Plots of the demand function fits are provided at the end of this document. The power law model leads to the following expression for $Q_p(p^0)$:

$$Q_p(p^0) = \beta^1 \exp(\beta^0)(p^0)^{\beta^1 - 1}.$$

Also because of the high variance in the QPM, we will use the observed QPM at the time of the price change, $Q^0$, instead of the model value $Q(p^0)$. This substitution makes the new price dependent on the observed QPM, such that a deal with a higher observed QPM will receive a higher price change.

Incorporating the power law model and the observed QPM, expressions for the optimal price are as follows:

Excess capacity case:

$$p^* = \frac{1}{2}\left[p^0 - Q^0 / \left(\beta^1 \exp(\beta^0) \ (p^0)^{\beta^1 - 1}\right)\right]$$

Limited capacity case:

$$p^* = p^0 + (C/I - Q^0)/(\beta^1 \exp(\beta^0)(p^0)^{\beta^1 - 1})$$

Finally, one or more of a number of "business rules" may be imposed to ensure the new prices fall within a reasonable range: (1) Price change <=10%; (2) No price change if the net change is <$0.50 or <2%; (3) Round prices to nearest $0.99; and/or (4) No price decreases (to be removed when price decrease is unblocked)

In some embodiments, a learning model may be implemented. For example, when demand function estimates based on historical data do not provide sufficiently accurate input, a learning model may aim to estimate the demand function on-the-fly and optimize price based on the observed demand function.

A first iteration or an initial estimate in the model may assign weights to demand functions in the input set according to observed sales data. An iterative model may learn demand through multiple price changes. Multiple price changes may re-optimize prices as more data become available.

In an iterative learning model, the process may have no prior knowledge of the demand function. And instead, learn the demand function. The learning approach allows us to bypass estimating the demand function and measure it directly from data. Since this is a direct measurement of the deal's demand function, it may be superior to what can be obtained from historical data.

In an iterative learning model, at least 2 price changes may be needed to learn the demand function. The first price change may only an initial guess. Optimization may then begin at the second price change. The second price change may occur on feature night when a significant fraction of the sales has already occurred. In some embodiments, shorter price change intervals may be used (e.g., less than one day) and/or the learning model may be used in conjunction with another model that may provide a better estimate of the first price change. In some embodiments, promotions may exhibit a systematic QPM shift over time, and accordingly, the systematic shift may be taken into account.

The iterative learning model may seek to optimize the current period revenue without considering the effects on later period. In some embodiments, however, total revenue may be optimized. In some embodiments, a promotion may launch at initial price on a prefeature day or an initial evaluation day. Subsequently, a first price change may be implemented at the end of prefeature period or after an initial evaluation day. The price change may be determined by a second model. At the end of a second evaluation period (e.g., a second day) and each subsequent evaluation period, a demand function (e.g., Q=β^0+β^1 p where Q is the vector of measured QPM and p is the vector of price changes) may be determined. Reoptimization may then occur as price as $p\hat{\ }*=-\beta\hat{\ }0/(2\ \beta\hat{\ }1)$.

In some embodiments, a historical ranked model may be implemented. In some embodiments, in the historical ranked model, promotions may be segmented based on category, location, and/or price point. Historical promotions may be ranked (e.g., last X months) in each segment by bookings or other sales related data. Price may then be increased by a fixed percentage amount if current promotion is above, for example, the segment median, and or decreased by a fixed percentage amount if a current promotion is below, for example, the segment median. In some embodiments, no price change may occur if no historical promotions exist or can be utilized in a segment. In this model, segmentation compares a current promotion to relevant promotions (e.g., promotions similarly categorized by segment).

In some embodiments, a segment model may be utilized. In some embodiments, the segment model may be utilized or otherwise implemented with one or more other models, and as such, is configured to implement one or more other models on a particular one or more category, sub-category, location, hyper-location, price range or the like. For example, using a booking model, two specific segments may be utilized, such as Beauty High Priced deals (Segment One) and Leis Mid/High Priced deals (Segment Two). In each segment, top selling deals (in terms of booking) may be used. In some embodiments, In some embodiments, consumers may be segments. For example, push customers may have lower QPM than pull customers. Push customers may account for most of the page views and purchases early on, but no longer dominate later in the promotion period. In some embodiments, a demand function of pull customers may be different from that of the push customers. In some embodiments, one or more different demographic segments (e.g., age, male/female, or the like) be utilized, for example, because each of one or more demographic segment may have different elasticity towards different categories or the like.

Computing Device Architecture

In some embodiments of the present invention, an apparatus, such as a pricing apparatus 100, dynamic pricing module 105, dynamic price calculator module 110, promotion data collection module 115, or demand forecast module 120 may be embodied by a computing device. The computing device may include or be associated with an apparatus 1300 as shown in FIG. 13. In this regard, the apparatus may include or otherwise be in communication with a processor 1322, a memory device 1324, a communication interface 1326 and a user interface 1328. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 1322 (and/or co-processors or any other processing circuitry assisting or otherwise associated with the processor) may be in communication with the memory device 1324 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 1300 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 1300 may configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 1322 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 1322 may be configured to execute instructions stored in the memory device 1324 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In an example embodiment, the processor may also include user interface circuitry configured to control at least some functions of one or more elements of the user interface 1328.

Meanwhile, the communication interface 1326 may be any means such as a device or circuitry embodied in either hardware or a combination of hardware and software that is configured to receive and/or transmit data between apparatus 100 and databases 110 and/or 180. In this regard, the communication interface 1326 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 1328 may be in communication with the processor 1322, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 1324 and/or the communication interface 1326, such as via a bus.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for programmatically facilitating dynamic pricing of a promotion, in real-time, based on one or more factors by adjusting a first promotion price of a price adjustable promotion to a second promotion price, the method comprising:
    electronically providing, via a communication interface, a plurality of promotions, configured for display on a user interface of a consumer device, the plurality of promotion including the price adjustable promotion at a first promotion price, the price adjustable promotion comprising a plurality of redemption parameters;
    executing an iterative learning model configured to receive, as input, market reaction data, and output an updated promotion price,
    wherein the execution of the iterative learning model comprises:
    collecting market reaction data, indicating a volume and a velocity at which the price adjustable promotion sells;
    identifying the price adjustable promotion from the plurality of promotions by determining eligibility for a price adjustment, the price adjustable promotion having (i) the first promotion price, (ii) a forecasted demand that provides an indication of a promotion inventory exhaustion period and a plurality of redemption parameters that comprise at least a promotional period, (iii) a promotional value, and (iv) a redemption expiration;
    wherein the determination of the eligibility for the price adjustment comprises:
        determining a probability that the price adjustable promotion will sell out based on the market reaction data, utilizing the iterative learning model;
        comparing a confidence value indicative of the strength of the determined probability that the price adjustable promotion will sell out;
        outputting the forecasted demand for the price adjustable promotion in an instance in which the confidence value satisfies the predetermined revenue threshold; and
        determining that the promotion inventory exhaustion period overlaps a next price change time demonstrating that the first promotional price is adjustable prior to an expiration of the promotion inventory exhaustion period, wherein the next price change time defines a next time that the first promotional price can be adjusted and is calculated based on consumer behavior that is tracked in real time;
    utilizing the market reaction data to generate, using a processor of a dynamic price calculator module executing on a pricing apparatus, the updated promotion price for the price adjustable promotion by adjusting a previous promotion price based on (i) the forecasted demand, (ii) a remaining inventory of the promotion, and (iii) an estimated revenue;
    electronically providing, via the communication interface, configured for display at the user interface of the consumer device, the price adjustable promotion at the updated promotion price while at least one of the plurality of redemption parameters for the price adjustable promotion remain constant,
    wherein, during a first iteration, the previous promotion price is the first promotion price;
    determining if the price adjustable promotion is sold out; and
    in an instance in which the price adjustable promotion is not sold, continuing with the execution of the iterative learning model.

2. The method according to claim 1, further comprising:
accessing promotion data for the price adjustable promotion, wherein the promotion data includes a quantity of units that make up the price adjustable promotion inventory and at least one of a category of the price adjustable promotion, a category of a merchant offering the price adjustable promotion, or a merchant quality score of the merchant offering the price adjustable promotion.

3. The method according to claim 1, wherein determining a price adjustable promotion from a plurality of promotions further comprises:

determining that the price adjustable promotion is eligible for a price adjustment based on the forecasted demand and promotion data for the promotion being received within a predefined time window.

4. The method according to claim 1, further comprising: determining a value of f that will solve equation:

$$P(s \in S | f^*) > \tau^*$$

which defines unknown factor as $\phi = f^*$.

5. The method according to claim 4, wherein the probability that the price adjustable promotion will sell out is based on a pre-feature of the promotion and a calculated intensity of the demand for the promotion during the pre-feature.

6. The method according to claim 4, wherein the probability that the price adjustable promotion will sell out is based on historical data.

7. The method according to claim 1, wherein the next pricing change time is a function of a next communication to one or more consumers that indicates a promotional price for the price adjustable promotion.

8. The method according to claim 1, wherein the next pricing change time is a function of a market reaction data, collected periodically.

9. The method according to claim 1, wherein the next pricing change time is a time at which the price adjustable promotion is first offered via the promotion service.

10. The method according to claim 1, wherein next pricing change time is generated by:
estimating a velocity of sales of the price adjustable promotion based on at least one of the forecasted demand, historical sales data or current sales data for the price adjustable promotion; and
determining the next pricing change time as a function of a remaining quantity of units that make up the price adjustable promotion inventory and a revenue value.

11. The method according to claim 1, wherein generating the second promotional price for the price adjustable promotion further comprises:
comparing a promotion quantity factor to a first pricing threshold value, wherein in an instance in which the promotion quantity factor satisfies the first pricing threshold value generating a second promotion price for the promotion as a function of a first pricing factor and a margin value generated by the first promotion price; and
comparing the promotion quantity factor to a second pricing threshold value in an instance in which the promotion quantity factor does not satisfy the first dynamic pricing threshold value, wherein in an instance in which the promotion quantity factor satisfies the second pricing threshold value, generating a second promotion price as a function of a second pricing factor and a margin value generated by the first promotion price.

12. An apparatus for programmatically facilitating dynamic pricing of a promotion, in real-time, based on one or more factors by adjusting a first promotion price of a price adjustable promotion to a second promotion price, the apparatus comprising at least a processor, and a memory associated with the processor having computer coded instructions therein, with the computer instructions configured to, when executed by the processor, cause the apparatus to:
electronically provide, via a communication interface, a plurality of promotions, configured for display on a user interface of a consumer device, the plurality of promotions including the price adjustable promotion at a first promotion price, the price adjustable promotion comprising a plurality of redemption parameters;
execute an iterative learning model configured to receive, as input, market reaction data, and output an updated promotion price,
wherein the execution of the iterative learning model comprises:
collect market reaction data, indicating a volume and a velocity at which the price adjustable promotion sells;
identify the price adjustable promotion from the plurality of promotions by determining eligibility for a price adjustment, the price adjustable promotion having (i) the first promotion price, (ii) a forecasted demand that provides an indication of a promotion inventory exhaustion period and a plurality of redemption parameters that comprise at least a promotional period, (iii) a promotional value, and (iv) a redemption expiration;
wherein the determination of the eligibility for the price adjustment comprises:
determining a probability that the price adjustable promotion will sell out based on the market reaction data, utilizing the iterative learning model;
comparing a confidence value indicative of the strength of the determined probability that the price adjustable promotion will sell out;
outputting the forecasted demand for the price adjustable promotion in an instance in which the confidence value satisfies the predetermined revenue threshold; and
determining that the promotion inventory exhaustion period overlaps a next price change time demonstrating that the first promotional price is adjustable prior to an expiration of the promotion inventory exhaustion period, wherein the next price change time defines a next time that the first promotional price can be adjusted and is calculated based on consumer behavior that is tracked in real time;
utilize the market reaction data to generate, using a processor of a dynamic price calculator module executing on a pricing apparatus, the updated promotion price for the price adjustable promotion by adjusting a previous promotion price based on (i) the forecasted demand, (ii) a remaining inventory of the promotion, and (iii) an estimated revenue;
electronically provide, via the communication interface, configured for display at the user interface of the consumer device, the price adjustable promotion at the updated promotion price while at least one of the plurality of redemption parameters for the price adjustable promotion remain constant,
wherein, during a first iteration, the previous promotion price is the first promotion price;
determine if the price adjustable promotion is sold out; and
in an instance in which the price adjustable promotion is not sold, continue with the execution of the iterative learning model.

13. The apparatus according claim 12, wherein the at least one memory and the computer program code are further configured to, with the processor, cause the apparatus to:
access promotion data for the price adjustable promotion, wherein the promotion data includes a quantity of units that make up the price adjustable promotion inventory and at least one of a category of the price adjustable promotion, a category of a merchant offering the price adjustable promotion, or a merchant quality score of the merchant offering the price adjustable promotion.

14. The apparatus according to claim 12, wherein determining a price adjustable promotion from a plurality of promotions further comprises:
determining that the price adjustable promotion is eligible for a price adjustment based on the forecasted demand and promotion data for the promotion being received within a predefined time window.

15. The apparatus according claim 12, wherein the at least one memory and the computer program code are further configured to, with the processor, cause the apparatus to:
determine a value of f that will solve equation:

$$P(s \in S | f^*) > \tau^*$$

which defines unknown factor as $\phi = f^*$.

16. The apparatus according to claim 15, wherein the probability that the price adjustable promotion will sell out is based on a pre-feature of the promotion and a calculated intensity of the demand for the promotion during the pre-feature.

17. The apparatus according to claim 15, wherein the probability that the price adjustable promotion will sell out is based on historical data.

18. The apparatus according to claim 12, wherein the next pricing change time is a function of a next communication to one or more consumers that indicates a promotional price for the price adjustable promotion.

19. The apparatus according to claim 12, wherein the next pricing change time is a function of a market reaction data, collected periodically.

20. The apparatus according to claim 12, wherein the next pricing change time is a time at which the price adjustable promotion is first offered via the promotion service.

21. The apparatus according to claim 12, wherein next pricing change time is generated by:
estimating a velocity of sales of the price adjustable promotion based on at least one of the forecasted demand, historical sales data or current sales data for the price adjustable promotion; and
determining the next pricing change time as a function of a remaining quantity of units that make up the price adjustable promotion inventory and a revenue value.

22. The apparatus according to claim 12, wherein generating the second promotional price for the price adjustable promotion further comprises:
comparing a promotion quantity factor to a first pricing threshold value, wherein in an instance in which the promotion quantity factor satisfies the first pricing threshold value generating a second promotion price for the promotion as a function of a first pricing factor and a margin value generated by the first promotion price; and
comparing the promotion quantity factor to a second pricing threshold value in an instance in which the promotion quantity factor does not satisfy the first dynamic pricing threshold value, wherein in an instance in which the promotion quantity factor satisfies the second pricing threshold value, generating a second promotion price as a function of a second pricing factor and a margin value generated by the first promotion price.

23. A computer program product for programmatically facilitating dynamic pricing of a promotion, in real-time, based on one or more factors by adjusting a first promotion price of a price adjustable promotion to a second promotion price, the computer program product comprising a non-transitory computer readable medium having computer program instructions stored therein, said instructions when executed by a processor:
electronically providing, via a communication interface, a plurality of promotions, configured for display on a user interface of a consumer device, the plurality of promotion including the price adjustable promotion at a first promotion price, the price adjustable promotion comprising a plurality of redemption parameters;
executing an iterative learning model configured to receive, as input, market reaction data, and output an updated promotion price,
wherein the execution of the iterative learning model comprises:
collecting market reaction data, indicating a volume and a velocity at which the price adjustable promotion sells;
identifying the price adjustable promotion from the plurality of promotions by determining eligibility for a price adjustment, the price adjustable promotion having (i) the first promotion price, (ii) a forecasted demand that provides an indication of a promotion inventory exhaustion period and a plurality of redemption parameters that comprise at least a promotional period, (iii) a promotional value, and (iv) a redemption expiration;
wherein the determination of the eligibility for the price adjustment comprises:
determining a probability that the price adjustable promotion will sell out based on the market reaction data, utilizing the iterative learning model;
comparing a confidence value indicative of the strength of the determined probability that the price adjustable promotion will sell out;
outputting the forecasted demand for the price adjustable promotion in an instance in which the confidence value satisfies the predetermined revenue threshold; and
determining that the promotion inventory exhaustion period overlaps a next price change time demonstrating that the first promotional price is adjustable prior to an expiration of the promotion inventory exhaustion period, wherein the next price change time defines a next time that the first promotional price can be adjusted and is calculated based on consumer behavior that is tracked in real time;
utilizing the market reaction data to generate, using a processor of a dynamic price calculator module executing on a pricing apparatus, the updated promotion price for the price adjustable promotion by adjusting a previous promotion price based on (i) the forecasted demand, (ii) a remaining inventory of the promotion, and (iii) an estimated revenue;
electronically providing, via the communication interface, configured for display at the user interface of the consumer device, the price adjustable promotion at the updated promotion price while at least one of the plurality of redemption parameters for the price adjustable promotion remain constant,
wherein, during a first iteration, the previous promotion price is the first promotion price;
determining if the price adjustable promotion is sold out; and
in an instance in which the price adjustable promotion is not sold, continuing with the execution of the iterative learning model.

24. The computer program product according to claim 23, wherein the computer-executable program code portions further comprise program code instructions for:

accessing promotion data for the price adjustable promotion, wherein the promotion data includes a quantity of units that make up the price adjustable promotion inventory and at least one of a category of the price adjustable promotion, a category of a merchant offering the price adjustable promotion, or a merchant quality score of the merchant offering the price adjustable promotion.

25. The method according to claim 23, wherein determining a price adjustable promotion from a plurality of promotions further comprises:
determining that the price adjustable promotion is eligible for a price adjustment based on the forecasted demand and promotion data for the promotion being received within a predefined time window.

26. The computer program product according to claim 23, wherein the computer-executable program code portions further comprise program code instructions for:
determining a value of f that will solve equation:

$$P(s \in S | f^*) > \tau^*$$

which defines unknown factor as $\phi = f^*$.

27. The computer program product according to claim 26, wherein the probability that the price adjustable promotion will sell out is based on a pre-feature of the promotion and a calculated intensity of the demand for the promotion during the pre-feature.

28. The computer program product according to claim 26, wherein the probability that the price adjustable promotion will sell out is based on historical data.

29. The computer program product according to claim 23, wherein the next pricing change time is a function of a next communication to one or more consumers that indicates a promotional price for the price adjustable promotion.

30. The computer program product according to claim 23, wherein the next pricing change time is a function of a market reaction data, collected periodically.

31. The computer program product according to claim 23, wherein the next pricing change time is a time at which the price adjustable promotion is first offered via the promotion service.

32. The computer program product according to claim 23, wherein next pricing change time is generated by:
estimating a velocity of sales of the price adjustable promotion based on at least one of the forecasted demand, historical sales data or current sales data for the price adjustable promotion; and
determining the next pricing change time as a function of a remaining quantity of units that make up the price adjustable promotion inventory and a revenue value.

33. The computer program product according to claim 23, wherein generating the second promotional price for the price adjustable promotion further comprises:
comparing a promotion quantity factor to a first pricing threshold value, wherein in an instance in which the promotion quantity factor satisfies the first pricing threshold value generating a second promotion price for the promotion as a function of a first pricing factor and a margin value generated by the first promotion price; and
comparing the promotion quantity factor to a second pricing threshold value in an instance in which the promotion quantity factor does not satisfy the first dynamic pricing threshold value, wherein in an instance in which the promotion quantity factor satisfies the second pricing threshold value, generating a second promotion price as a function of a second pricing factor and a margin value generated by the first promotion price.

* * * * *

UNITED STATES PATENT AND TRADEMARK OFFICE
CERTIFICATE OF CORRECTION

| | | |
|---|---|---|
| PATENT NO. | : 10,949,894 B1 | Page 1 of 1 |
| APPLICATION NO. | : 14/298291 | |
| DATED | : March 16, 2021 | |
| INVENTOR(S) | : Bansal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this
Thirteenth Day of December, 2022

Katherine Kelly Vidal
*Director of the United States Patent and Trademark Office*